United States Patent
Sasaki et al.

(10) Patent No.: US 7,945,171 B2
(45) Date of Patent: May 17, 2011

(54) OPTICAL PULSE TIME SPREADER AND OPTICAL CODE DIVISION MULTIPLEXING TRANSMISSION DEVICE

(75) Inventors: Kensuke Sasaki, Kanagawa (JP); Akihiko Nishiki, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 614 days.

(21) Appl. No.: 11/587,492

(22) PCT Filed: Dec. 21, 2005

(86) PCT No.: PCT/JP2005/023453
§ 371 (c)(1),
(2), (4) Date: Oct. 26, 2006

(87) PCT Pub. No.: WO2006/082689
PCT Pub. Date: Aug. 10, 2006

(65) Prior Publication Data
US 2007/0223927 A1   Sep. 27, 2007

(30) Foreign Application Priority Data
Jan. 12, 2005   (JP) .................................. 2005-004867

(51) Int. Cl.
*G02B 6/34* (2006.01)
*G02B 6/26* (2006.01)
*H04J 14/08* (2006.01)
*H04J 14/00* (2006.01)

(52) U.S. Cl. ............ 398/191; 398/98; 398/77; 398/189; 398/190; 398/193; 385/37; 385/27

(58) Field of Classification Search .................. 398/191, 398/188, 77, 78; 375/279–283, 322–336; 385/10, 37

See application file for complete search history.

(56) References Cited

U.S. PATENT DOCUMENTS
4,625,245 A * 11/1986 White .............................. 360/40
(Continued)

FOREIGN PATENT DOCUMENTS
JP   2003-244101   8/2003
(Continued)

OTHER PUBLICATIONS
Akihiko Nishiki, Hisashi Iwamura, Hideyuki Kobayashi, Satoko Kutsuzawa, Saeko Oshiba 'Development of OCDM phase encoder using SSFBG' Technical Report of IEICE. OFT2002-66, (Nov. 2002).
(Continued)

*Primary Examiner* — Ken N Vanderpuye
*Assistant Examiner* — Oommen Jacob
(74) *Attorney, Agent, or Firm* — Rabin & Berdo, PC

(57) ABSTRACT

A phase control arrangement has a structure in which a Superstructured fiber Bragg Grating (SSFBG) 40 has fifteen unit Fiber Bragg Gratings (FBGs) arranged in series in a waveguide direction. The SSFBG 40 is fixed to the core of an optical fiber 36 that includes a core 34 and cladding 32. The difference Δn between the maximum and minimum of the effective refractive index of the optical fiber is $6.2 \times 10^{-5}$. The phase difference of Bragg reflected light from two unit diffraction gratings that adjoin one another from front to back and provide equal code values is given by $2\pi M + (\pi/2)$, where M is an integer. Further, the phase difference of the Bragg reflected light from two unit diffraction gratings that adjoin one another from front to back and provide different code values is given by $2\pi M + (2N+1)\pi + (\pi/2)$ where M and N are integers. The ratio P/W between the peak value P and the subpeak value W of the autocorrelation waveform, and the ratio P/C between the peak value P of the autocorrelation waveform and the maximum peak value C of the cross correlation waveform are both large.

10 Claims, 15 Drawing Sheets

U.S. PATENT DOCUMENTS

| | | | |
|---|---|---|---|
| 5,305,321 A * | 4/1994 | Crayford | 370/389 |
| 6,628,864 B2 * | 9/2003 | Richardson et al. | 385/37 |
| 6,654,521 B2 * | 11/2003 | Sheng et al. | 385/37 |
| 6,724,955 B2 * | 4/2004 | Sasaki et al. | 385/24 |
| 7,050,676 B2 * | 5/2006 | Adachi et al. | 385/37 |
| 7,099,538 B2 * | 8/2006 | Zervas | 385/37 |
| 7,127,140 B2 * | 10/2006 | Kobayashi et al. | 385/37 |
| 7,174,103 B2 | 2/2007 | Nishiki et al. | |
| 7,440,656 B2 * | 10/2008 | Sasaki et al. | 385/37 |
| 7,443,920 B2 * | 10/2008 | Thesling et al. | 375/269 |
| 7,474,859 B2 * | 1/2009 | Mahgerefteh et al. | 398/201 |
| 2002/0150334 A1 * | 10/2002 | Richardson et al. | 385/37 |
| 2003/0077038 A1 * | 4/2003 | Murashima et al. | 385/37 |
| 2003/0156847 A1 | 8/2003 | Nishiki | |
| 2003/0161581 A1 * | 8/2003 | Nishiki et al. | 385/37 |
| 2004/0028331 A1 * | 2/2004 | Ishii et al. | 385/37 |
| 2004/0033018 A1 * | 2/2004 | Durkin et al. | 385/37 |
| 2004/0052495 A1 * | 3/2004 | Englund et al. | 385/141 |
| 2004/0062554 A1 * | 4/2004 | Lee et al. | 398/201 |
| 2004/0218859 A1 * | 11/2004 | Yamashita et al. | 385/37 |
| 2004/0258358 A1 * | 12/2004 | Duguay et al. | 385/39 |
| 2005/0009557 A1 * | 1/2005 | Watanabe et al. | 455/550.1 |
| 2005/0046873 A1 * | 3/2005 | Suzuki | 356/605 |
| 2005/0089328 A1 * | 4/2005 | Nishiki et al. | 398/77 |
| 2005/0123300 A1 * | 6/2005 | Kim et al. | 398/84 |
| 2006/0002489 A1 * | 1/2006 | Zuhdi et al. | 375/282 |
| 2006/0140636 A1 * | 6/2006 | Marazzi et al. | 398/147 |
| 2007/0003290 A1 * | 1/2007 | Menendez | 398/190 |

FOREIGN PATENT DOCUMENTS

| | | |
|---|---|---|
| JP | 2004-228840 | 8/2004 |
| JP | 2004-341307 | 12/2004 |

OTHER PUBLICATIONS

Hideyuki Sotobayashi, 'Optical code division multiplexing network', Applied Physics, vol. 71, 7.(2002) pp. 853 to 859.

* cited by examiner

Input Optical Puls

Encoded Optical Pulse Train

Encoded Optical Pulse Train

Overlap

Autocorrelation Waveform

Drawing to illustrate the operating principles of the encoder and decoder

Schematic explanatory diagram of refractive index modulation structure of conventional phase control means

OPTICAL PULSE TIME SPREADER AND OPTICAL CODE DIVISION MULTIPLEXING TRANSMISSION DEVICE

TECHNICAL FIELD

The present invention relates to an optical pulse time spreader that time-spreads an optical pulse into chip pulses. More specifically, the present invention relates to an optical encoder or optical decoder that is an applied example of an optical pulse time spreader. More particularly, the present invention relates to an optical encoder or optical decoder comprising phase control means of a constitution in which unit diffraction gratings are arranged in series along the waveguide direction of the optical fiber. Further, the present invention relates to an optical code division multiplexing transmission method that is implemented by using the optical pulse time spreader and a device for implementing this method.

BACKGROUND ART

In recent years, the demand for communications has increased rapidly as a result of the spread of the Internet and so forth. High capacity networks have accordingly been completed at high speed by using optical fiber. Further, in order to establish high-capacity communications, an optical multiplexing technology that transmits a plurality of channels' worth of optical pulse signals together via one optical fiber transmission line has been investigated.

As optical multiplexing technology, optical time division multiplexing (OTDM), wavelength division multiplexing (WDM) and optical code division multiplexing (OCDM) have been intensively researched. Among these technologies, OCDM has the merit of flexibility on the operation side, that is, of having no restrictions on the time axis allocated one bit at a time of the optical pulse signals that are transmitted and received in OTDM and WDM and so forth. Further, OCDM has the merit that a plurality of channels can be established in the same time slot on the time axis or a plurality of communication channels can also be established with the same wavelength on the wavelength axis.

Subsequently, the expression 'optical pulse signal' signifies an optical pulse train reflecting a binary digital signal. That is, an optical pulse train reflecting a binary digital signal in correspondence with the existence and nonexistence of optical pulses constituting the optical pulse train on a time axis with respect to an optical pulse train in which optical pulses stand in a row at regular fixed intervals (time interval corresponding to the reciprocal of the frequency corresponding to the bit rate) is an optical pulse signal.

OCDM is a communication method that extracts signals by means of pattern matching by allocating codes (patterns) that are different for each channel. That is, OCDM is an optical multiplexing technology that encodes an optical pulse signal by means of an optical code that is different for each communication channel on the transmission side and which restores the original optical pulse signal by performing decoding by using the same optical codes on the reception side as on the transmission side.

Because only the optical pulse signals whose codes correspond are extracted and processed as effective signals during decoding, an optical pulse signal that consists of light rendered by combining the same wavelengths or a plurality of wavelengths can be allocated to a plurality of communication channels. Further, because a passive light element such as a Fiber Bragg Grating (FBG) can be used as the phase control means of the optical encoder to perform the phase control required for code processing, it is possible to deal with a higher communication rate without the encoding processing being subject to electrical restrictions. Further, suppose that a plurality of channels can be multiplexed at the same time and same wavelength and large-capacity data communications are possible. In comparison with OTDM and WDM and so forth, the focus is on being able to rapidly increase the communication capacity.

As OCDM encoding means, an optical phase code system that uses the phase of light as code is known. More specifically, a Superstructured Fiber Bragg Grating (SSFBG) is used as the encoder and decoder (See Non-patent documents 1 and 2, or Patent document 1, for example).

The operating principles in a case where an optical pulse time spreader comprising phase control means formed by using an SSFBG encoder is used as an encoder and decoder will now be described with reference to FIGS. 1(A) to 1(E). FIG. 1(A) shows the time waveform of an input optical pulse. FIG. 1(E) serves to illustrate an aspect in which an encoded optical pulse train that has been encoded by an encoder is decoded by a decoder.

The input optical pulse shown in FIG. 1(A) is encoded as a result of being input to an encoder 10 from an optical fiber 12 via an optical circulator 14. The input optical pulse then passes through the optical fiber 18 via the optical circulator 14 once again before being input to a decoder 20 via an optical circulator 22. Further, an autocorrelation waveform is generated as a result of decoding by a decoder 20 and the autocorrelation waveform passes through an optical fiber 26 via the optical circulator 22.

The encoder 10 and decoder 20 shown in FIG. 1(E) are an SSFBG constituted by arranging four unit Fiber Bragg Gratings (FBG) in the waveguide direction of the optical fiber. Here, as an example, the functions of the encoder 10 and decoder 20 will be described by using a four-bit optical code (0, 0, 1, 0). Here, the number of items in the numerical sequence consisting of '0's and '1's that provides the optical code is also called the codelength. In this example, the codelength is 4. Further, the numerical sequence providing the optical code is called a code string and each item '0' and '1' of the code string is also known as a chip. Further, the values 0 and 1 are also called code values.

The unit FBGs 10a, 10b, 10c, and 10d constituting the encoder 10 correspond with a first chip '0' of the abovementioned optical codes, a second chip '0', a third chip '1', and a fourth chip '0' respectively. The determination of whether the code value is 0 or 1 is the phase relationship of the Bragg reflected light that is reflected by adjacent FBG units. That is, because the first chip and second chip have an equal code value 0, the phase of the Bragg reflected light reflected by unit FBG 10a corresponding with the first chip and the phase of the Bragg reflected light reflected by unit FBG 10b corresponding with the second chip are equal. Further, because the code value of the second chip is 0 and the code value of the third chip is 1, the two chips have mutually different values. Therefore, the difference between the phase of the Bragg reflected light reflected by unit FBG 10b corresponding with the second chip and the phase of the Bragg reflected light reflected by unit FBG 10c corresponding with the third chip is π. Likewise, because the code value of the third chip is 1 and the code value of the fourth chip is 0, the two chips have mutually different values. Therefore, the difference between the phase of the Bragg reflected light reflected by unit FBG 10c corresponding with the third chip and the phase of the Bragg reflected light reflected by unit FBG 10d corresponding with the fourth chip is π.

Thus, because the phases of the Bragg reflected light from the unit FBGs are changed, the specified optical code is also known as 'optical phase code'.

A process in which an autocorrelation waveform is formed as a result of an optical pulse being encoded by an encoder and converted to an encoded optical pulse train and the encoded optical pulse train being decoded by a decoder will be described next. When the single optical pulse shown in FIG. 1(A) is input from the optical fiber 12 to the encoder 10 via the optical circulator 14 and optical fiber 16, Bragg reflected light from the unit FBGs 10a, 10b, 10c, and 10d is generated. Therefore, suppose that the Bragg reflected light from the unit FBGs 10a, 10b, 10c, and 10d is a, b, c, and d. That is, the single optical pulse shown in FIG. 1(A) is converted into an encoded optical pulse train as a result of time spreading of the Bragg reflected light a, b, c, and d.

When the Bragg reflected light a, b, c, and d is represented on a time axis, an optical pulse train resulting from arrangement at specified intervals that depend on the method of arranging the unit FBGs 10a, 10b, 10c, and 10d on the time axis through division into four optical pulses is constituted as shown in FIG. 1(B). Therefore, an encoded optical pulse train is an optical pulse train that is produced as a result of time-spreading an optical pulse that is input to the encoder as a plurality of optical pulses on a time axis.

FIG. 1(B) shows an encoded optical pulse train that passes through the optical fiber 18 with respect to the time axis. In FIG. 1(B), for the purpose of a quick representation of the encoded optical pulse train, the optical pulses are shown displaced in the vertical axis direction.

The Bragg reflected light of unit FBG 10a is the optical pulse denoted by a in FIG. 1(B). Likewise, the Bragg reflected light of FBG 10b, FBG 10c, and FBG 10d are optical pulses denoted by b, c, d respectively in FIG. 1(B). The optical pulse denoted by a is an optical pulse that is reflected by the unit FBG 10a closest to the input end of the encoder 10 and is therefore in the most temporally advanced position. The optical pulses denoted by b, c, and d are each Bragg reflected light from the FBG 10b, FBG 10c, and FBG 10d respectively. Further, the FBG 10b, FBG 10c, and FBG 10d stand in a line in a row from the input end of the encoder 10 and, therefore, the optical pulses denoted by b, c, and d stand in a line in the order b, c, d after the optical pulse denoted by a as shown by FIG. 1(B). In the subsequent description, the optical pulses corresponding with the Bragg reflected light a, Bragg reflected light b, Bragg reflected light c, and Bragg reflected light d respectively are also represented as the optical pulse a, optical pulse b, optical pulse c, and optical pulse d. Further, the optical pulse a, optical pulse b, optical pulse c, and optical pulse d are also each called chip pulses.

The relationship between the phases of the Bragg reflected light a, b, c, and d that constitute the encoded optical pulse train is as follows as mentioned earlier. The phase of the Bragg reflected light a and the phase of the Bragg reflected light b are equal. The difference between the phase of the Bragg reflected light b and the phase of the Bragg reflected light c is π. The difference between the phase of the Bragg reflected light c and the phase of the Bragg reflected light d is π. That is, when the phase of the Bragg reflected light a is taken as the reference, the phases of the Bragg reflected light a, Bragg reflected light b, and Bragg reflected light d are equal and the phase of the Bragg reflected light c differs by π from the phases of the Bragg reflected light a, Bragg reflected light b, and Bragg reflected light d.

Therefore, in FIG. 1(B), the optical pulses corresponding with the Bragg reflected light a, the Bragg reflected light b and Bragg reflected light d are denoted by solid lines and the optical pulse corresponding with the Bragg reflected light c is denoted by a dotted line. That is, in order to distinguish the relationship between the phases of the respective Bragg reflected light, solid lines and dotted lines are used to represent the corresponding optical pulses. The phases of the optical pulses denoted by a solid line are in a mutually equal relationship and the phases of optical pulses denoted by dotted lines are in a mutually equal relationship. Further, the phases of the optical pulses denoted by a solid line and the optical pulses denoted by a dotted line differ by π from one another.

An encoded optical pulse train is input to the decoder 20 via the optical circulator 22 after passing through the optical fiber 18. Although the decoder 20 has the same structure as the encoder 10, the input end and output end are reversed. That is, the unit FBGs 20a, 20b, 20c, and 20d stand in a line in order starting from the input end of the decoder 20 but the unit FBG 20a and unit FBG 10d correspond. Further, a unit FBG 20b, unit FBG 20c and unit FBG 20d likewise correspond with the unit FBG 10c, unit FBG 10b, and unit FBG 10a respectively.

In the encoded optical pulse train that is input to the decoder 20, the optical pulse a constituting the encoded optical pulse train is first Bragg-reflected by the unit FBGs 20a, 20b, 20c, and 20d. This aspect will be described with reference to FIG. 1(C). In FIG. 1(C), the horizontal axis is the time axis. Further, the relationship before and after a time is illustrated by expediently assigning 1 to 7, where smaller numerical values denote increasingly early times.

FIG. 1(C) shows an encoded optical pulse train with respect to the time axis in the same way as FIG. 1B. When the encoded optical pulse train is input to the decoder 20, the encoded optical pulse train is first Bragg-reflected by unit FBG 20a. The reflected light that is Bragg-reflected by unit FBG 20a is shown as 'Bragg reflected light a'. Likewise, the reflected light that is Bragg-reflected by the unit FBG 20b, unit FBG 20c, and unit FBG 20d is shown as the Bragg reflected light b', c', and d' respectively.

The optical pulses a, b, c and d constituting the encoded optical pulse train are Bragg-reflected by unit FBG 20a and stand in a line on the time axis of the string denoted by a' in FIG. 1(C). The optical pulse a that is Bragg-reflected by unit FBG 20a is an optical pulse that has a peak in a certain position that is denoted by 1 on the time axis. The optical pulse b that is Bragg-reflected by unit FBG 20a is an optical pulse with a peak in a certain position that is denoted by 2 on the time axis. Likewise, the optical pulse c and optical pulse d are optical pulses with a peak in a certain position denoted by 3 and 4 respectively on the time axis.

The optical pulses a, b, c, and d that constitute the encoded optical pulse train are also Bragg-reflected by unit FBG 20b and stand in a line on the time axis of the string denoted by b' in FIG. 1(C). The Bragg-reflected reflected light b' that is reflected by unit FBG 20b has a phase that is shifted by π in comparison with the phases of the Bragg-reflected light a', c' and d'. Therefore, the string of optical pulses that stand in a line on the time axis of the string denoted by a' and the string of optical pulses that stand in a line on the time axis of the string denoted by b' have phases that are all shifted by π.

As a result, whereas a string of optical pulses that stand in a line in the order 1 to 4 on the time axis denoted by a' stand in a line in the order of a solid line, solid line, dotted line, and solid line, a string of optical pulses that stand in a line in the order 2 to 5 on the time axis denoted by b' stand in a line in the order of a dotted line, dotted line, solid line, and dotted line. The displacement on the time axis of the optical pulse train denoted by a' and the optical pulse train denoted by b' is because, among the optical pulses constituting the encoded optical pulse train, the optical pulse a is input to the decoder 20 before the optical pulse b.

Likewise, the optical pulses a, b, c, and d that constitute the encoded optical pulse train are also Bragg-reflected by the unit FBG 20c and unit FBG 20d and the optical pulses stand in a line on the time axis of the strings denoted by c' and d' respectively in FIG. 1(C). The Bragg-reflected light c' and d' reflected by the unit FBG 20c and unit FBG 20d have phases that are equal in comparison with the Bragg-reflected light a'. Therefore, in FIG. 1(C), the optical pulse train denoted by c' and the optical pulse train denoted by d' stand in a line on the time axis. The optical pulses related to the Bragg-reflected light a', c', and d' are shifted in parallel on the time axis but the mutual phase relationship between the optical pulses related to the Bragg-reflected light is the same.

FIG. 1(D) shows the autocorrelation waveform of the input optical pulses that are decoded by the decoder 20. The horizontal axis is the time axis and corresponds to the illustration shown in FIG. 1(C). The autocorrelation waveform is obtained by the sum of the Bragg-reflected light a', b', c', and d' from the respective unit FBGs of the decoder and, therefore, all the Bragg-reflected light a', b', c' and d' shown in FIG. 1(C) is brought together. Because the optical pulses related to the Bragg-reflected light a', b', c' and d' are all added together with the same phase at the time shown as 4 on the time axis of FIG. 1(C), a maximum peak is formed. Further, because two optical pulses denoted by a dotted line and one optical pulse denoted by a solid line are added together at the time shown as 3 on the time axis of FIG. 1(C), one optical pulse's worth of peaks whose phases differ by $\pi$ are formed for the maximum peak at the time shown as 4. Further, because two optical pulses denoted by a solid line and one optical pulse denoted by a dotted line are added together at the time shown as 1 on the time axis of FIG. 1(C), one optical pulse's worth of peaks whose phases are equal are formed for the maximum peak at the time shown as 4.

As described hereinabove, the optical pulses are encoded by the encoder 10 to produce an encoded optical pulse train and the encoded optical pulse train is decoded by the decoder 20 to generate an autocorrelation waveform. In the example taken here, an optical code (0,0,1,0) of four bits (codelength 4) is used but the description above is equally valid even in cases where optical code is not used.

The schematic structure of conventional phase control means will now be described with reference to FIGS. 2(A) and 2(B). FIG. 2(A) is a schematic cross-sectional view of the phase control means. The phase control means has a structure in which an SSFBG 30 is fixed to a core 34 of an optical fiber 36 comprising the core 34 and cladding 32. The SSFBG 30 is constituted such that 15 unit FBGs are arranged in series in the waveguide direction of the core 34 constituting the optical waveguide of the optical fiber 36.

When the optical phase code which is set for the phase control means of the conventional optical pulse time spreader shown in FIG. 2(A) is written as a 15-bit code string, the result is (0,0,0,1,1,1,1,0,1,0,1,1,0,0,1). Further, the relationship of correspondence between the abovementioned optical code and the unit FBGs arranged in series in the core 34 is as follows. That is, the unit FBGs, which are arranged in a direction extending from the left end to the right end of the SSFBG 30 shown in FIG. 2(A) and the chips, which are arranged in a direction extending from the left end to the right end of (0,0,0,1,1,1,1,0,1,0,1,1,0,0,1) that represents the optical codes of the unit FBGs noted as the abovementioned 15-bit code string correspond with one another one-on-one.

FIG. 2(B) schematically shows the refractive index modulation structure of the SSFBG 30 shown in FIG. 2(A). The horizontal axis is a position coordinate in the longitudinal direction of the optical fiber 36 forming the SSFBG 30. The vertical axis represents the refractive index modulation structure of the optical fiber 36 and the difference between the maximum and minimum of the effective refractive index of the optical fiber 36 is represented as $\Delta n$. Further, in FIG. 2(B), the refractive index modulation structure of the optical fiber 36 is drawn partially enlarged.

The refractive index modulation cycle is $\Lambda$. Therefore, the Bragg reflection wavelength $\lambda$ is given by $\lambda=2N_{eff}\Lambda$. Here, $N_{eff}$ is the effective refractive index of the optical fiber 36. In the subsequent description, the effective refractive index is also simply called the refractive index for the sake of simplification.

In FIG. 2(A), when the phases of the Bragg-reflected light of adjacent unit FBGs differ by $\pi$, the intervals between adjacent unit FBGs are shown shaded black. Further, when the phases of the Bragg reflected light of adjacent unit FBGs are equal, an optical modulation structure in which the intervals between the unit FBGs are continuous is shown. On the other hand, in FIG. 2(B), when the phases of the Bragg-reflected light of adjacent unit FBGs differ by $\pi$, black triangles are shown added to the intervals of the two unit FBGs.

When the phases of the Bragg reflected light of adjacent unit FBGs are equal, the refractive index modulation structure of the two unit FBGs is a continuous cycle structure. On the other hand, when the phases of the Bragg reflected light of adjacent unit FBGs differ by $\pi$, the refractive index modulation structure of the two unit FBGs have a shift of only $\pi$ (jump in the pie phase) inserted at the boundary between the two unit FBGs.

Table 1 shows the relationship between the optical phase code (0, 0, 0, 1, 1, 1, 1, 0, 1, 0, 1, 1, 0, 0, 1) and the phase difference of the Bragg reflected light of adjacent unit FBGs for implementing the optical code. At the top of Table 1, the code values of the optical phase code established for the conventional phase control means shown in FIG. 2(A) are shown lined up in a row as code. Further, the phase difference of the Bragg reflected light of adjacent unit FBGs is shown as the phase shift amount in the bottom level of Table 1. The unit FBGs arranged extending from the left end to the right end of the SSFBG 30 shown in FIG. 2(A) and the chips arranged extending from the left end to the right in brackets representing the optical phase code (0, 0, 0, 1, 1, 1, 1, 0, 1, 0, 1, 1, 0, 0, 1) correspond one for one.

TABLE 1

| Code | 0 | 0 | 0 | 1 | 1 | 1 | 1 | 0 | 1 | 0 | 1 | 1 | 0 | 0 | 1 |
|---|---|---|---|---|---|---|---|---|---|---|---|---|---|---|---|
| Phase shift amount | 0 | 0 | $\pi$ | 0 | 0 | 0 | $\pi$ | $\pi$ | $\pi$ | $\pi$ | 0 | $\pi$ | 0 | $\pi$ | |

The geometric interval between adjacent unit FBGs in which the phase shift amount is $\pi$ is converted to a phase value to become $\pi/2$ due to light traveling there and back between adjacent unit FBGs. Generally, when the interval between adjacent unit FBGs for which the phase shift amount is $\pi$ is converted to a phase value, the interval is given by $\pi N+(\pi/2)$ with N as an integer. That is, the phase difference of the Bragg reflected light from adjacent unit FBGs for which the phase shift amount is $\pi$ is given by $2\pi N+\pi$. Further, the geometric interval between adjacent unit FBGs for which the phase shift amount is 0 is converted to a phase value and given by πN, and the phase difference of the Bragg reflected light from the two unit FBGs is given by 2πN.

Further, subsequently, when the phase shift amount is written, general notation such as πN+(π/2) is sometimes omitted and also written simply as π/2.

[Non-Patent Document 1]
Akihiko Nishiki, Hisashi Iwamura, Hideyuki Kobayashi, Satoko Kutsuzawa, Saeko Oshiba 'Development of OCDM phase encoder using SSFBG' Technical Report of IEICE. OFT2002-66, (2002-11),

[Non-Patent Document 2]
Hideyuki Sotobayashi, 'Optical code division multiplexing network', Applied Physics, Volume 71, 7. (2002) pages 853 to 859,

[Patent Document 1]
U.S. Pat. No. 6,628,864,

DISCLOSURE OF THE INVENTION

Problems to be Solved by the Invention

However, when encoding and decoding are executed by means of an optical pulse time spreader that comprises conventional phase control means exemplified by FIGS. 2(A) and 2(B), there is interference as a result of the feet of the chip pulses constituting the encoded optical pulse train overlapping on the time axis and, therefore, the encoding and decoding illustrated with reference to FIG. 1 are sometimes not implemented according to the design. The above problem in a case where encoding and decoding are executed by an optical pulse time spreader comprising conventional phase control means will be described specifically with respect to the effect of interference between the Bragg reflected light from the unit FBGs constituting the phase control means, for example, with reference to FIGS. 3(A) to 3(F).

FIG. 3(F) is a conceptual constitutional cross-sectional view of the phase control means 38 of an optical pulse time spreader comprising a unit FBG41 and unit FBG42. When the input optical pulse 44 is input to the phase control means 38, the respective Bragg reflected light 46 and Bragg reflected light 48 are generated by the unit FBGs 41 and 42.

FIG. 3(A) shows a time waveform for an optical pulse that is input to the phase control means 38. FIG. 3(B) is a time waveform of the Bragg reflected light 46 and Bragg reflected light 48 that are reflected by the unit FBGs 41 and 42. FIG. 3(B) shows a chip pulse 46P (dotted line) and a chip pulse 48P (solid line) that correspond with the Bragg reflected light 46 and Bragg reflected light 48 respectively. As shown in FIG. 3(B), the feet of the chip pulse 46P and chip pulse 48P overlap temporally as indicated by the oblique lines.

When the phase difference between the chip pulse 46P and chip pulse 48P is π, the encoded optical pulse train is as shown in FIG. 3(C). That is, as shown in FIG. 3(B), in the part where the chip pulse 46P and chip pulse 48P temporally overlap (the part shaded with the oblique lines in FIG. 3(B)), the chip pulse 46P and chip pulse 48P interfere with one another and cancel each other out. Hence, the optical intensity grows smaller in the interval on the time axis between the chip pulse 46P and chip pulse 48P.

On the other hand, when the phase difference between the chip pulse 46P and chip pulse 48P is 0, the encoded optical pulse train is as shown in FIG. 3(D). That is, as shown in FIG. 3(B), in the part where the chip pulse 46P and chip pulse 48P temporally overlap (the part shaded with the oblique lines in FIG. 3(B)), the chip pulse 46P and chip pulse 48P interfere with one another and reinforce each other. Hence, the optical intensity is large in comparison with the case shown in FIG. 3(C) in the interval on the time axis between the chip pulse 46P and chip pulse 48P.

FIG. 3(E) shows an encoded optical pulse train in a case where the phase difference between the chip pulses 46P and 48P is π/2 or 3π/2. In this case, the optical intensity between chip pulse 46P and chip pulse 48P on the time axis is larger than the case shown in FIG. 3(C) and smaller than the case shown in FIG. 3(D).

In order to implement a binary code by means of an SSFBG, the phase difference between adjacent unit FBGs can also be implemented through determination as two types π/2 and 3π/2 instead of 0 and π. Thus, if an optical encoder in which an SSFBG constituted by agreeing upon the phase difference is the phase control means is used, the encoded optical pulse generated by the optical encoder is such that the intensities between chip pulses as shown in FIG. 3(E) are equal even when the phase difference between adjacent unit FBGs is any of π/2 and 3π/2. The advantages obtained as a result of the intensities between the chip pulses constituting the encoded optical pulse all being equal will be described in detail subsequently.

A case where encoding and decoding are executed by a conventional optical pulse time spreader exemplified by FIGS. 2(A) and 2(B) was investigated hereinabove while considering the description while referencing FIGS. 3(C) to 3(E).

An encoded waveform, autocorrelation waveform, and cross correlation waveform in a case where encoding and decoding are executed by the conventional optical pulse time spreader exemplified by FIGS. 2(A) and 2(B) are shown in FIGS. 4(A) to 4(C). In FIGS. 4(A) to 4(C), the horizontal axis shows time calibrated in ps units and the vertical axis is shown calibrated with the optical intensity on an optional scale. Further, in the drawings, which show encoded waveforms representing the encoded optical pulse train shown in FIG. 4(A), the area ratio is illustrated as 0.15 but the area ratio has the following meaning. That is, the area ratio is the ratio between the energy of the optical pulse that is input to a conventional optical pulse time spreader and the energy of an encoded optical pulse train. The energy of the optical pulse that is input to the conventional optical pulse time spreader is in proportion to the time axis and the area circled by a curved line that provides the intensity distribution of the optical pulse, in the drawing (not shown) that represents the time waveform. On the other hand, the energy of the encoded optical pulse train is in proportion to the time axis and the area circled by the curved line that provides the intensity distribution of the encoded waveform in the drawing shown in FIG. 4(A).

When the encoded waveform shown in FIG. 4(A) is viewed, the intensity of the chip pulses constituting the encoded optical pulse train is small in part Q where code values emerge as being mutually different. Further, the intensity of the chip pulses constituting the encoded optical pulse train increases in parts R and S in which the same code values appear consecutively.

Here, part Q, where code values emerge as being mutually different, corresponds with a point where the code values constituting the optical code appear as ( . . . ,0,1,0,1, . . . ). Further, parts R and S, where the same code values appear consecutively, each correspond with points where the code values constituting the optical code appear as ( . . . ,1,1,1, 1, . . . ) and (,0,0,0,0, . . . ).

That is, large variations in the intensity of the encoded optical pulse train occur depending on the order of arrangement of the code values constituting the optical code. As a result of such variations, the peak value of the autocorrelation waveform obtained as a result of decoding is small and leads to the occurrence of an obstacle in the step of extracting the autocorrelation waveform by removing the cross correlation waveform from the decoded signal.

Here, the effect on the autocorrelation waveform obtained through decoding as a result of the occurrence of variations in the intensity of the encoded optical pulse train due to the abovementioned interference between the chip pulses constituting the encoded optical pulse train will be described with reference to FIGS. 5(A) and 5(B).

FIG. 5(A) shows an autocorrelation waveform with the same optical code (0,0,0,1,1,1,1,1,0,1,0,1,1,0,0,1) as the optical code set for the phase control means shown in FIGS. 2(A) and 2(B). FIG. 5(B) shows the cross correlation waveform. The horizontal axis in each of FIGS. 5(A) and 5(B) is a time axis shown calibrated in ps units and the vertical axis is shown calibrated with the optical intensity on an optional scale.

The autocorrelation waveform and cross correlation waveform shown in FIGS. 5(A) and 5(B) are obtained by way of a simulation in which variations in the intensity of the encoded optical pulse train can be ignored because the width of the chip pulses constituting the encoded optical pulse train is relatively narrow in comparison with the time interval between the chip pulses and the earlier mentioned interference between the chip pulses does not exist. The cross correlation waveform is obtained by using completely inverted optical codes to decode the code values of the optical codes. That is, the optical code for the decoding that is used in order to simulate the cross correlation waveform is (1,1,1,0,0,0,0, 1,0,1,0,0,1,1,0).

The relative value of the peak value of the autocorrelation waveform shown in FIG. 5(A) (also subsequently referred to as the 'signal peak' and indicated by 'P') is 225 and the relative value of the largest subpeak (subsequently represented by 'W') of the subpeak that exists on both sides of the signal peak is 9. Therefore, the ratio between the signal peak value P and the subpeak value W for the largest subpeak is 25 (P/W=225/9=25). Further, the maximum peak value (represented by C subsequently) of the cross correlation waveform shown in FIG. 5(B) is 49 and the ratio between the signal peak value P and the maximum peak value C of the cross correlation waveform is 4.6(P/C=225/49≈4.6).

When P/W is likewise found for the autocorrelation waveform shown in FIG. 4(B) that is obtained when encoding and decoding are executed by means of the conventional phase control means exemplified by FIGS. 2(A) and 2(B), the results are as follows. Each time an autocorrelation waveform is found, an experiment was performed by reversing the order of arrangement of the code values of the encoder and decoder. Because P=7.36 and W=0.624, P/W=7.36/0.624≈11.8. If the result of the simulation in the ideal case shown in FIG. 5(A) is P/W=25, P/W is substantially half the size when compared with the results of the simulation.

Furthermore, when P/C is likewise found for the cross correlation waveform shown in FIG. 4(C) that is obtained when encoding and decoding are executed by means of the conventional phase control means exemplified by FIGS. 2(A) and 2(B), the results are as follows. Each time a cross correlation waveform is found, an experiment was performed by making the order of arrangement of the code values of the encoder and decoder the same. Because P=7.36 and C=2.73, P/C=7.36/2.73≈2.7. If the result of the simulation in the ideal case shown in FIG. 5(B) is P/C=4.6, P/C is on the order of 60% of the size when compared with the results of the simulation.

It can be seen that, with respect to the autocorrelation waveform and cross correlation waveform obtained when encoding and decoding are executed by conventional phase control means, both P/W and P/C have small values in comparison with the results of a simulation in an ideal case, as mentioned earlier. Incidentally, as P/W and P/C both increase, it is easy to separate the autocorrelation waveform, which is a signal in a decoded case.

When optical code division multiplexing communication is performed by using an optical pulse time spreader that comprises conventional phase control means for which the values of P/W and P/C are of the magnitude shown in FIGS. 4(B) and 4(C), the following problems arise. That is, because the intensity of the encoded optical pulse train decreases as a result of the absorption of light by the optical fiber constituting the transmission line and of the invasion of the encoded optical pulse train by optical noise that is produced by an optical amplifier that is integrated into the device if required, the extraction of the autocorrelation waveform peak is problematic.

Furthermore, when there is a separation from the characteristic results of the code correlation simulation for which an ideal case is assumed, the correlation characteristic of the optical pulse time spreader cannot be estimated and an OCDM or other system design that uses an optical pulse time spreader as an encoder and decoder is problematic.

Therefore, an object of the present invention is to provide an optical pulse time spreader that approximates P/W and P/C when there is no interference between chip pulses and large values of P/W and P/C are obtained. That is, an object of the present invention is to provide an optical pulse time spreader that separates the cross correlation waveform component from the decoded optical pulse signal from the autocorrelation waveform and obtains larger values of P/W and P/C the more the identification conditions set for the judgment circuit for identifying the autocorrelation waveform can be relaxed.

A further object is to provide an optical code division multiplexing method that uses the optical pulse time spreader of the present invention and an optical code division multiplexing transmission device for implementing this method. As a result, the design of the optical code division multiplexing transmission device can be simplified.

Means for Solving the Problems

The optical pulse time spreader constituting the first invention has a function that time-spreads an optical pulse as a series of chip pulse stream that are sequentially arranged on the time axis by means of encoding that employs optical phase code and outputs the series of chip pulse stream, and possesses the following characteristics.

That is, the optical pulse time spreader comprises phase control means that generate the series of chip pulse stream by providing a phase difference between adjacent chip pulses among chip pulses corresponding with the code values constituting the optical phase code. Further, when the adjacent code values are equal, the phase control means give the phase difference between the corresponding chip pulses by $$2\pi M + (\pi/2) \qquad (1),$$

and, when the adjacent code values are different, the phase control means give the phase difference between the corresponding chip pulses by $$2\pi M + (2N+1)\pi + (\pi/2) \qquad (2), \text{where M and N are integers.}$$

Alternatively, the phase control means has a function for giving the phase difference between chip pulses corresponding with different adjacent code values by means of Equation (1) above and for giving the phase difference between chip pulses corresponding with adjacent equal code values by means of Equation (2).

Further, a constitution in which unit diffraction gratings, which are arranged in a row and correspond one for one with the code values that constitute the optical code, are disposed in series in the waveguide direction of the optical waveguide is used for the phase control means which is preferably constituted so that the phase difference of the Bragg reflected light from two adjacent diffraction gratings in the vicinity satisfies Equations (1) and (2) above. The Bragg reflected light corresponds to the above chip pulses. That is, the chip pulses output by the phase control means constituted by the unit diffraction gratings are constituted by Bragg reflected light.

Further, when a constitution in which the unit diffraction gratings are disposed in series in the waveguide direction of the optical waveguide is used for the phase control means, the refractive index modulation intensity of the periodic refractive index modulation structure of the unit diffraction grating is preferably constituted by performing a podization by means of a window function.

Further, a constitution whereby the refractive index modulation intensity of the periodic refractive index modulation structure in which the unit diffraction gratings arranged in series in the waveguide direction of the optical waveguide are formed is monotonously increased in the waveguide direction of the optical waveguide is suitable.

In addition, more specifically, the optical pulse time spreader is suitably constituted comprising: phase control means comprising a number J (J is a natural number of 2 or more) of unit diffraction gratings, wherein numbers from first to Jth are assigned to the unit diffraction gratings sequentially from one end of the optical waveguide to the other end thereof; and the reflectance $R_i$ from the ith ($2 \leq i \leq J$) unit diffraction grating is given by reflectance $R_i = R_{i-1}/(1-R_{i-1})^2$ (3).

Further, the optical code division multiplexing transmission device constituting the second invention is characterized by using the optical pulse time spreader of the first invention as the encoder and decoder.

Effects of the Invention

The optical pulse time spreader constituting the first invention gives the phase difference between the chip pulses corresponding with the code values by means of Equations (1) and (2) above. Therefore, as already described schematically with reference to FIG. 3(E), the intensity between the chip pulses constituting the series of chip pulse stream generated by the optical pulse time spreader of the first invention is equal in either of the cases where the phase difference is given by Equations (1) and (2) above.

As a result, P/W and P/C are approximated when there is no interference between the chip pulses. Further, large values are obtained for P/W and P/C in comparison with a conventional optical encoder or an optical pulse time spreader that has been used as an optical decoder.

Further, when a constitution in which unit diffraction gratings that are arranged in a row and correspond one for one with the code values constituting the optical code is used for the phase control means, by constituting the refractive index modulation intensity of the periodic refractive index modulation structure of the unit diffraction grating such that same increases monotonously in the waveguide direction of the optical waveguide, the Bragg reflected light intensity from the unit FBG disposed in a position close to the entry end of the optical waveguide and the Bragg reflected light intensity from the unit FBG disposed in a position spaced apart from the entry end of the optical waveguide can be equalized.

Furthermore, because the optical pulse time spreader of the first invention is used as an encoder and decoder, the optical code division multiplexing transmission device of the second invention obtains large values for both the P/Wand P/C in comparison with a conventional optical pulse time spreader. Therefore, even when the intensity of the encoded optical pulse train decreases while same is propagated by the optical transmission line or optical noise invades the optical transmission line, the autocorrelation waveform peak can be extracted highly reliably through decoding.

EXPLANATIONS OF LETTERS OR NUMERALS

Figure 1A:
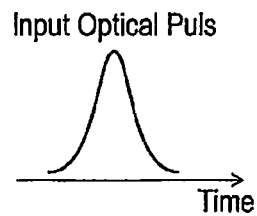
FIG. 1 serves to illustrate the operating principles of an encoder and decoder.
Figure 1B:
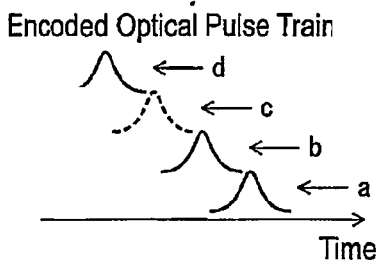
Figure 1C:
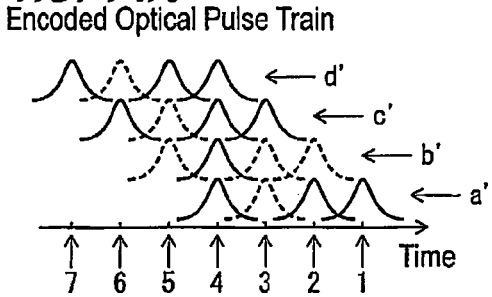
Figure 1D:
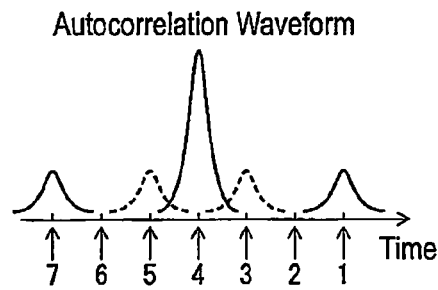
Figure 1E:
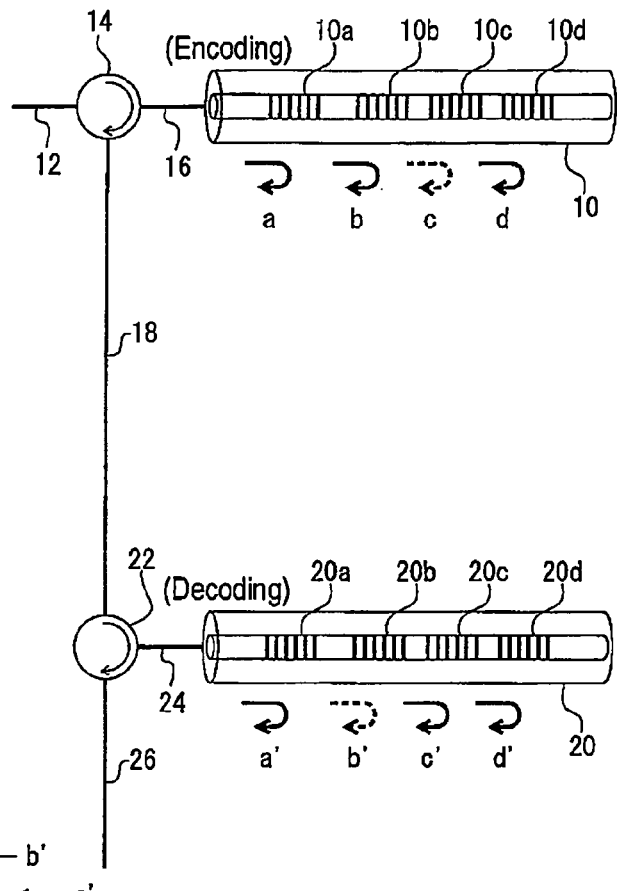

10, 150: encoder
14, 22, 52, 56: optical circulator
20, 184: decoder
30, 40, 70, 72: SSFBG
32: cladding
34: core 36: optical fiber
38: phase control means
41, 42: unit FBG
50: optical pulse generator
54: evaluation target encoder
58: evaluation target decoder
60, 62: optical oscilloscope
61, 144, 182: splitter
140: transmitting section
142: pulse light source
146: modulated electrical signal production section
148: modulator
160: encoding section of first channel
162: encoding section of second channel
164: encoding section of third channel
166: encoding section of fourth channel
170: multiplexer
172: optical transmission line
180: receiving section
190: photoreceptor
200: receiving-section first channel
202: receiving-section second channel
204: receiving-section third channel
206: receiving-section fourth channel

BEST MODE FOR CARRYING OUT THE INVENTION

Embodiments of the present invention will be described hereinbelow with reference to the drawings. Each of the drawings shows a constitutional example of the present invention. The cross-sectional shape and dispositional relationship and so forth of the respective constituent elements are only shown schematically and the present invention is not limited to the illustrated examples. Further, although specified materials and conditions and so forth are sometimes used in the following invention, these materials and conditions represent only one of the suitable examples and, therefore, are not limited in any way. Further, the same numbers are shown assigned to the same constituent elements in each of the drawings and repeated descriptions are sometimes omitted.

Further, although a case where the phase control means in the first to third embodiments optical is formed by using optical fiber has been adopted, the phase control means is not limited to optical fiber and can also be formed by using a planar-type optical waveguide or the like. The decision on whether to use optical fiber as the phase control means or to use a planar-type optical waveguide or the like is merely a design item. However, because, when an optical pulse time spreader is used as the optical communication system, the optical communication system employs optical fiber as the optical transmission line, usage of an optical pulse time spreader that is constituted by using optical fiber as the phase control means is often suitable.

I. Description of Optical Pulse Time Spreader

First Embodiment

Figure 6:
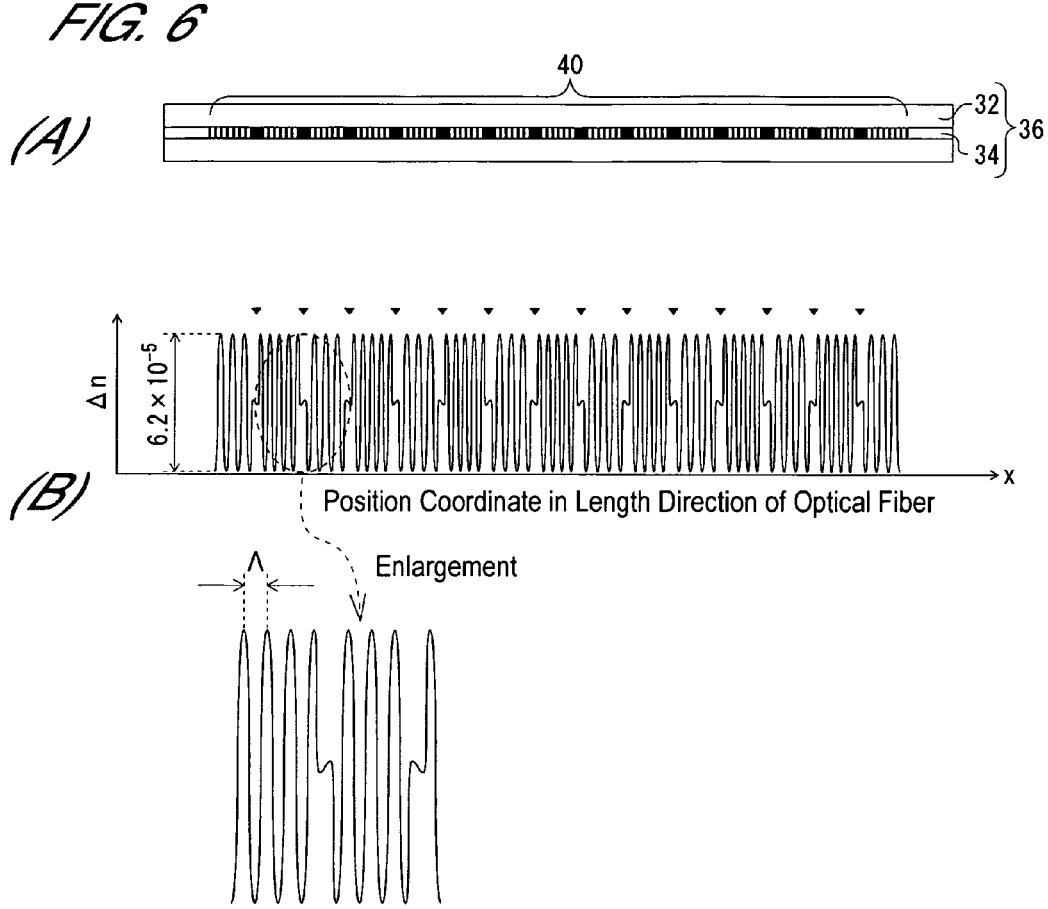
FIG. 6 is a schematic explanatory diagram of the refractive index modulation structure of the phase control means of the optical pulse time spreader of a first embodiment.

The structure of the phase control means of the optical pulse time spreader constituting the first embodiment of the first invention will now be described with reference to FIGS. 6(A) and 6(B). FIG. 6(A) is a schematic cross-sectional view of the phase control means. The phase control means have an SSFBG 40 fixed to a core 34 of an optical fiber 36 that comprises the core 34 and cladding 32. Fifteen unit FBGs are disposed in series in the waveguide direction of the core 34, which is the optical waveguide of the optical fiber 36, to constitute the SSFBG 40.

When the optical phase code set for the SSFBG 40 as the phase control means shown in FIG. 6(A) is written as 15 bit code string, the code becomes (0,0,0,1,1,1,1,0,1,0,1,1,0,0,1). Further, the relationship of correspondence between the fifteen unit FBGs disposed in series in core 34 and the optical phase code above is as follows. That is, the respective unit FBGs arranged in a direction from the left end to the right end of the SSFBG 40 shown in FIG. 6(A) and the respective chips arranged in a direction from the left end to the right end in brackets representing the optical phase code correspond one for one.

FIG. 6(B) schematically shows the refractive index modulation structure of the SSFBG 40 shown in FIG. 6(A). The horizontal axis is the position coordinate in the longitudinal direction of the optical fiber 36 forming the SSFBG 40. The vertical axis represents the refractive index modulation structure of the optical fiber 36 and the difference between the maximum and minimum of the refractive index of the core of the optical fiber 36 is represented as $\Delta n$, where $\Delta n=6.2\times10^{-5}$. Further, FIG. 6(B) is drawn with the refractive index modulation structure of the core 34 of the optical fiber 36 partially enlarged.

The refractive index modulation cycle $\Lambda$ is 535.2 nm. Further, the wavelength $\lambda$ of the encoded or decoded optical pulse is 1550 nm and the effective refractive index of the optical fiber 36 is 1.448. Therefore, the Bragg reflection wavelength is equal to the wavelength $\lambda$ of the optical pulse and is set as 1550 nm. That is, because $\lambda=1550$ nm, $N_{eff}=1.448$, and $\kappa=535.2$ nm, $\lambda=2N_{eff}\Lambda=2\times1.448\times535.2$ nm$=1549.94$ nm$\approx$1550 nm is satisfied. Further, the length of the unit FBG is set as 2.4 mm.

The relationship of the phases of the Bragg reflected light of the adjacent unit FBGs is established as follows. That is, the phase difference of the Bragg reflected light from two unit diffraction gratings that adjoin one another from front to back and provide equal code values is given by $$2\pi M+(\pi/2) \tag{1}$$

Where M is an integer. Further, the phase difference of the Bragg reflected light from the two unit diffraction gratings that adjoin one another from front to back and provide different code values are given by $$2\pi M+(2N+1)\pi+(\pi/2) \tag{2}$$

where M and N are integers.

Table 2 shows the relationship between the optical phase code (0,0,0,1,1,1,10,1,0,1,1,0,0,1) of the phase difference the Bragg reflected light of adjacent unit FBGs for implementing the optical phase code. The code values of the optical phase code set for the SSFBG 40 constituting the phase control means shown in FIG. 6(A) are shown lined up in a row as the code in the upper level of Table 2. Further, the phase difference of the Bragg reflected light of adjacent unit FBGs is shown as the phase shift amount in the lower level of Table 2. The unit FBGs arranged from the left end to the right end of the SSFBG 40 shown in F. 6A and the chips arranged from the left end to the right end in brackets representing the optical phase code correspond one for one.

TABLE 2

| Code | 0 | 0 | 0 | 1 | 1 | 1 | 1 | 0 | 1 | 0 | 1 | 1 | 0 | 0 | 1 |
|---|---|---|---|---|---|---|---|---|---|---|---|---|---|---|---|
| Phase shift amount | $\pi/2$ | $\pi/2$ | $3\pi/2$ $(-\pi/2)$ | $\pi/2$ | $\pi/2$ | $\pi/2$ | $3\pi/2$ $(-\pi/2)$ | $3\pi/2$ $(-\pi/2)$ | $3\pi/2$ $(-\pi/2)$ | $3\pi/2$ $(-\pi/2)$ | $\pi/2$ | $3\pi/2$ $(-\pi/2)$ | $\pi/2$ | | $3\pi/2$ $(-\pi/2)$ |

The geometrical interval between adjacent unit FBGs for which the phase shift amount is $\pi/2$ is $\pi/4$ when converted to a phase value because the light travels there and back between the adjacent unit FBGs. Generally, when the geometrical interval between adjacent unit FBGs for which the phase shift amount is $\pi/2$ is converted to a phase value, this geometrical interval is given by $\pi L+(\pi/4)$, where L is an integer. That is, the phase difference of the Bragg reflected light from adjacent unit FBGs for which the phase shift is $\pi/2$ is given by $2\pi L+(\pi/2)$. Further, when the geometrical interval between adjacent unit FBGs for which the phase shift amount is $3\pi/2$ is converted to a phase value, this geometrical interval is given by $\pi K+(3\pi/4)$, where K is an integer and the phase difference of the Bragg reflected light from the adjacent unit FBGs is given by $2\pi K+(3\pi/2)$.

Further, Table 2 shows $-\pi/2$ in brackets when K=−1 and $3\pi/2$ when K=0 in cases where the phase difference of the Bragg reflected light is given by $2\pi K+(3\pi/2)$. These values have substantially the same meaning as phase values. Further, by substituting with L=M and K=M+N, it is clear that the phase difference satisfies the relationship of Equations (1) and (2) above.

In FIG. 6(A), the interval between adjacent unit FBGs is shown shaded black. On the other hand, in FIG. 6(B), black triangles are shown added to the intervals of the adjacent unit FBGs.

Figure 7:
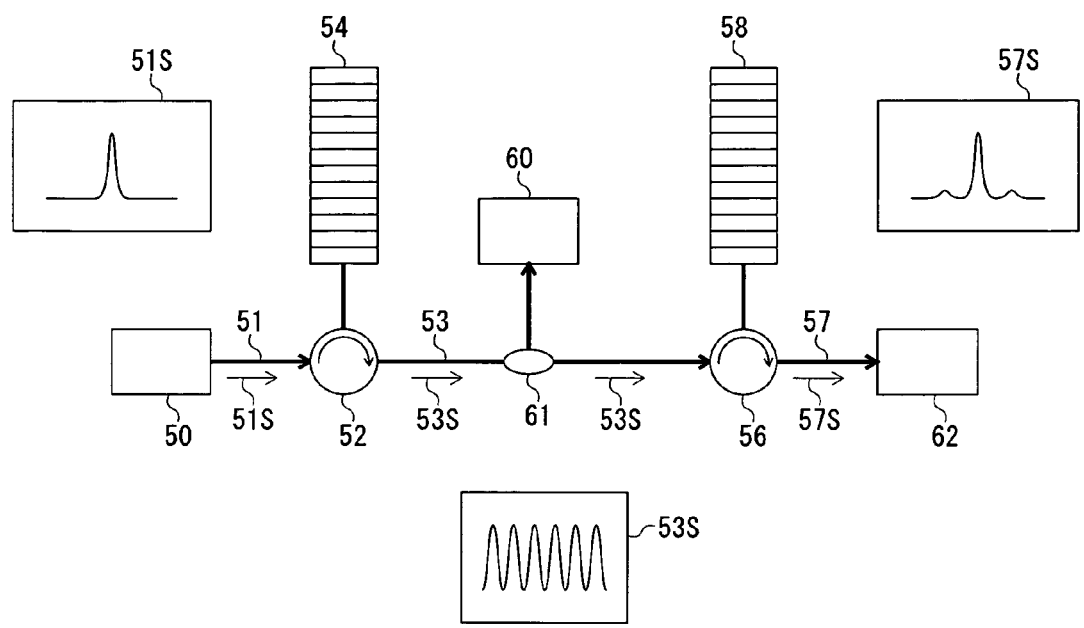
FIG. 7 is a schematic constitutional view of the characteristic evaluation device of the optical pulse time spreader.
Figure 8:
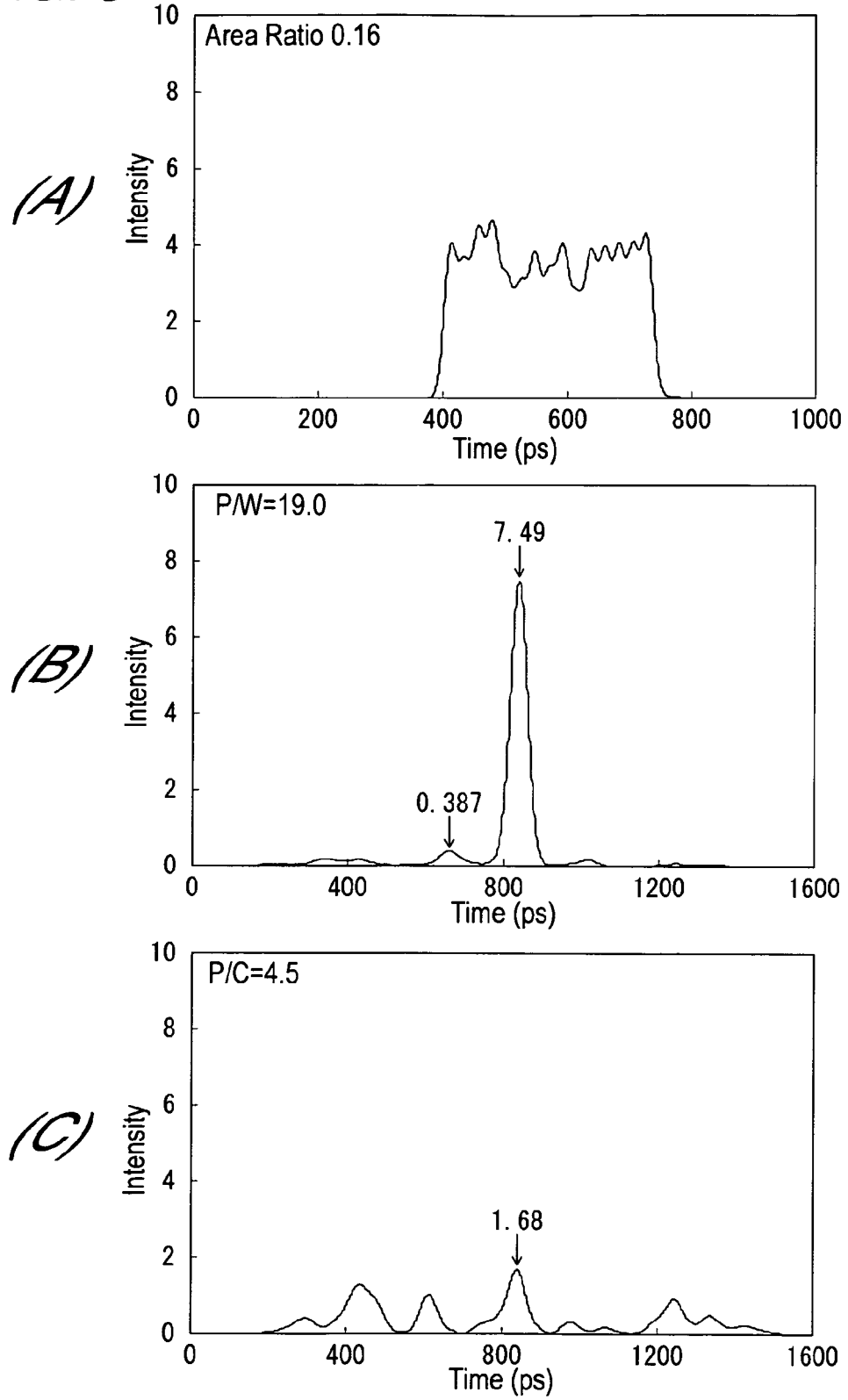
FIG. 8 shows an encoded waveform, autocorrelation waveform and cross correlation waveform of the optical pulse time spreader of the first embodiment.

The characteristic of the SSFBG 40 constituting the phase control means of the first embodiment will now be described with reference to FIGS. 7 and 8(A) to 8(C). FIG. 7 is a schematic constitutional view of a characteristic evaluation device that is used to evaluate the functions of the SSFBG 40. FIGS. 8(A) to 8(C) show the experiment results in a case where the encoding and decoding are executed by using the SSFBG 40 of the first embodiment. FIG. 8(A) shows an encoded waveform representing an encoded optical pulse train, FIG. 8(B) shows an autocorrelation waveform, and FIG. 8(C) shows a cross correlation waveform. In FIGS. 8(A) to 8(C), the horizontal axis is shown calibrated with time in ps units and the vertical axis is shown calibrated with the optical intensity on an optional scale.

First, the constitution of the characteristic evaluation device that is used to evaluate the functions of the SSFBG 40 will be described with reference to FIG. 7. The characteristic evaluation device is constituted comprising an optical pulse generator 50, optical circulators 52 and 56, and optical oscilloscopes 60 and 62. Further, an evaluation target encoder 54 is connected to the optical circulator 52 and an evaluation target decoder 58 is connected to the optical circulator 56. Further, a splitter 61 is provided midway along the optical fiber linking the optical circulator 52 and optical circulator 56 in order to observe an encoded waveform 53S. The splitter 61 is constituted to split a portion of the encoded waveform 53S and supply same to the optical oscilloscope 60.

An encoded waveform representing the encoded optical pulse train is observed by the optical oscilloscope 60 provided in the characteristic evaluation device shown in FIG. 7 and an autocorrelation waveform and a cross correlation waveform are observed by the optical oscilloscope 62.

An optical pulse 51S is produced by the optical pulse generator 50 before being propagated by a transmission line 51 and input to the evaluation encoder 54 via the optical circulator 52. The optical pulse 51S is encoded by the evaluation encoder 54 to produce an encoded optical pulse train 53S that is propagated once again by the transmission line 53 via the optical circulator 52. The encoded optical pulse train 53S is split by the splitter 61 and supplied to the optical oscilloscope 60 and observed. The encoded optical pulse train 53S is input to the evaluation decoder 58 via the optical circulator 56. The encoded optical pulse train 53S is decoded by the evaluation decoder 58 to produce an autocorrelation waveform (or cross correlation waveform) 57S which is propagated once again by a transmission line 57 via the optical circulator 56 before being supplied to the optical oscilloscope 62 and observed. Schematic shapes are shown surrounded by squares in FIG. 7 for encoded waveforms that represent the optical pulse 51S and encoded optical pulse train 53S and a decoded waveform that represents the autocorrelation waveform (or cross correlation waveform) 57S.

The half width of the optical pulse used in the characteristic evaluation of the SSFBG 40 of the first embodiment is 20 ps. That is, the half width of the optical pulse 51S produced by the optical pulse generator 50 is 20 ps. Further, the input end and output end of the SSFBG 40 are provided mutually reversed with respect to the encoder and decoder in order to obtain the autocorrelation waveform. In addition, the input end and output end of the SSFBG 40 are provided the same as one another with respect to the encoder and decoder in order to obtain the cross correlation waveform.

That is, two SSFBGs 40, which are phase control means with the same refractive index modulation structure, that is, SSFBGs 40 for which the same codes have been set, are fabricated, one of which is the evaluation encoder 54 and the other of which is the evaluation decoder 58. Therefore, the autocorrelation waveform was observed by installing unit FBGs so that the order of arrangement of unit FBGs that are arranged from the one end that faces the optical circulator 52 of the evaluation encoder 54 toward the other end and the order of arrangement of the unit FBGs that are arranged from the one end facing the optical circulator 56 of the evaluation decoder 58 toward the other end are reversed. Further, the cross correlation waveform was observed by installing unit FBGs so that the order of arrangement of unit FBGs that are arranged from the one end that faces the optical circulator 52 of the evaluation encoder 54 toward the other end and the order of arrangement of the unit FBGs that are arranged from the one end facing the optical circulator 56 of the evaluation decoder 58 toward the other end are the same.

The area ratio with respect to the encoded waveform representing the encoded optical pulse train 53S shown in FIG. 8(A) is 0.16. This is substantially the same size as the area ratio 0.15 with respect to the encoded waveform obtained by a conventional SSFBG. However, in comparison with the encoded waveform obtained by the conventional SSFBG shown in FIG. 4(A), variations in the intensity of the encoded optical pulse train are small. For this reason, as mentioned hereinbelow, the P/W value and P/C value are large.

P/W=19.0 for the decoded waveform representing the autocorrelation waveform shown in FIG. 8(B) and P/C=4.5 for the decoded waveform representing the cross correlation waveform shown in FIG. 8(C). On the other hand, the P/W value and P/C value in a case where encoding and decoding are performed by means of a conventional SSFBG are P/W=11.8 and P/C=2.7 respectively. It can be seen from this that a large value is obtained for both P/W and P/C when encoding and decoding are performed by using the optical pulse time spreader of the first embodiment.

Figure 5:
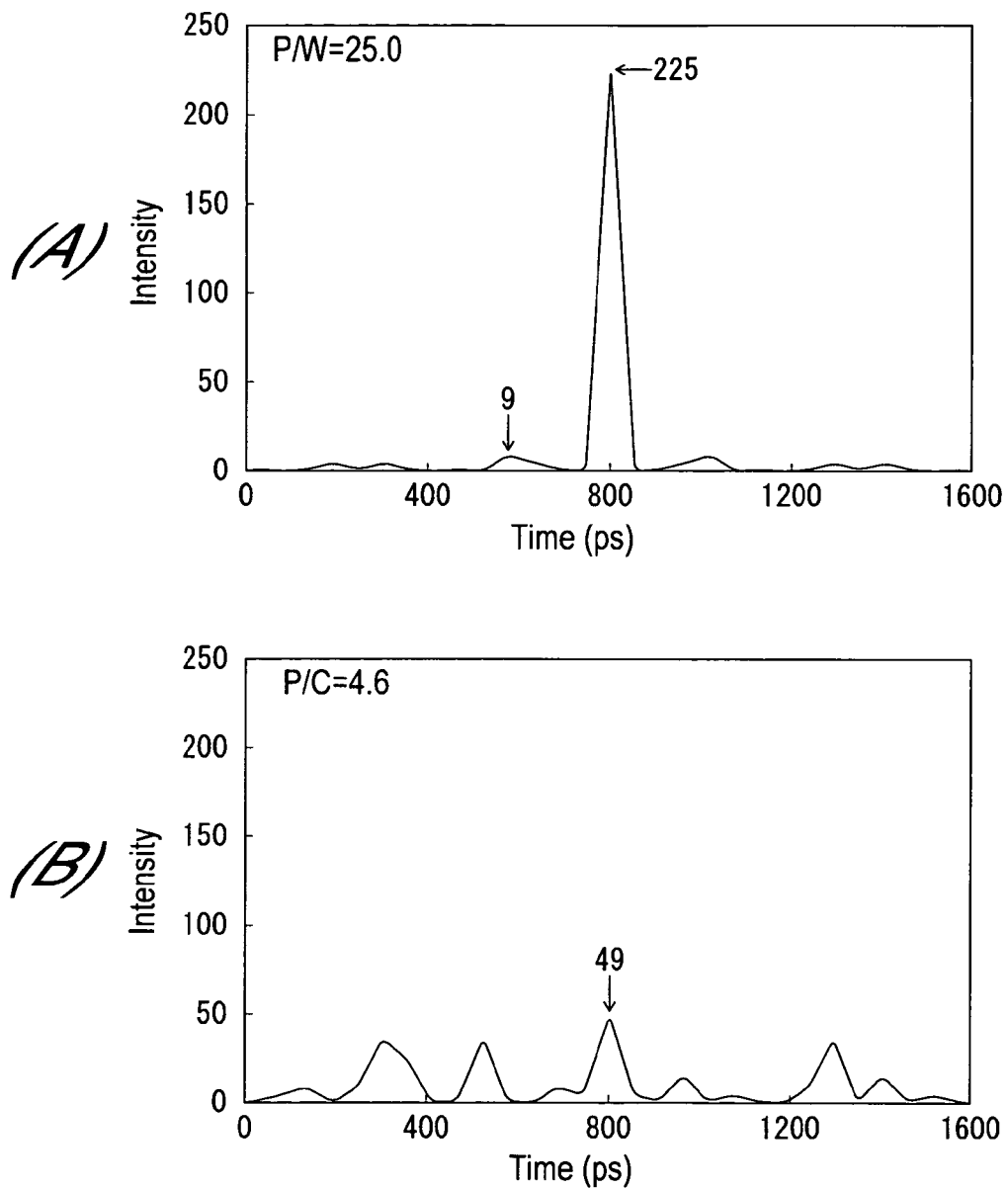
FIG. 5 shows the autocorrelation waveform and cross correlation waveform of optical code (0,0,0,1,1,1,1,0,1,0,1,1,0, 0,1)

It can be seen that these values approach the maximum values for the values of P/W and P/C described with reference to FIGS. 5(A) and 5(B). The values of both P/W and P/C described with reference to FIGS. 5(A) and 5(B) are values that are calculated when encoding/decoding has taken place in an ideal state in which time intervals between chip pulses constituting the encoded optical pulse train are sufficiently spaced apart and variations in the intensity of the encoded optical pulse train arising from interference between the chip pulses can be ignored.

The fact that the P/W value is large signifies that the peak of the autocorrelation waveform can be easily identified. Further, the fact that the P/C value is large signifies that separation of the autocorrelation waveform and the cross correlation waveform is straightforward. Therefore, with the optical code division multiplexing transmission device that uses the optical pulse time spreader of the first embodiment, the cross correlation waveform component from the decoded optical pulse signal is separated from the autocorrelation waveform component and the identification conditions set for the judgment circuit for identifying the autocorrelation waveform are relaxed.

Further, in the first embodiment, the relationship of the phases of the Bragg reflected light of adjacent unit FBGs was described by adopting the cases given by Equations (1) and (2) above. However, the optical pulse time spreaders contained in the technological scope of the present invention is not limited to a case where the relationship of the phases of the Bragg reflected light of the adjacent unit FBGs is strictly given mathematically by Equations (1) and (2) above. That is, this means that the best results are exhibited by the optical pulse time spreader of the present invention if the relationship of the phases of the Bragg reflected light of adjacent unit FBGs is strictly formed so as to be equal to the values given by Equations (1) and (2) above.

Even if fabrication involves a design such that the relationship of the phase of the Bragg reflected light of adjacent unit FBGs is given by Equations (1) and (2) above, fabrication errors in the fabrication steps and variations and so forth in the effective refractive index of the optical fiber constituting the material for fabricating the SSFBG constituting the phase control means exist. Therefore, the SSFBG is designed with the relationship given by Equations (1) and (2) above serving as design pointers. The fabricated SSFBG has a width of an accuracy based on the fabrication errors and so forth in the fabrication process and as long as the phase relationship given by Equations (1) and (2) above is satisfied, the SSFBG is naturally included in the technological scope of the phase control means of the present invention.

Furthermore, in the above embodiment, a constitution in which the phase difference of the output light of adjacent equal code values satisfies Equation (1) above and the phase difference of the output light of adjacent different code values satisfies Equation (2) above was described but, as is clear from Equations (1) and (2) above, because discrimination of whether adjacent code values are equal or different is favorable if the difference in phase difference of the respective output light satisfies $(2N+1)\pi$, the same effect can be obtained even with a constitution in which the phase difference of the output light of adjacent different code values satisfies Equation (1) above and the phase difference of output light of adjacent equal code values satisfies Equation (2) above.

In addition, in the above embodiment, although a constitution in which unit diffraction gratings, which correspond one for one with code values constituting the optical code that are arranged in a row, are arranged in series in the waveguide direction of the optical waveguide is used for the phase control means for generating chip pulses, the present invention is not limited to or by such a constitution.

For example, a transversal-type filter structure or the like that is formed by planar waveguide circuit technology is used as the phase control means and the same results can be obtained by creating a design such that the phase difference of the output light of adjacent equal code values satisfies Equation (1) above and the phase difference of the output light of adjacent different code values satisfies Equation (2) above or a design such that the phase difference of the output light of adjacent different code values satisfies Equation (1) above and the phase difference of the output light of adjacent equal code values satisfies Equation (2) above.

Second Embodiment

Figure 9:
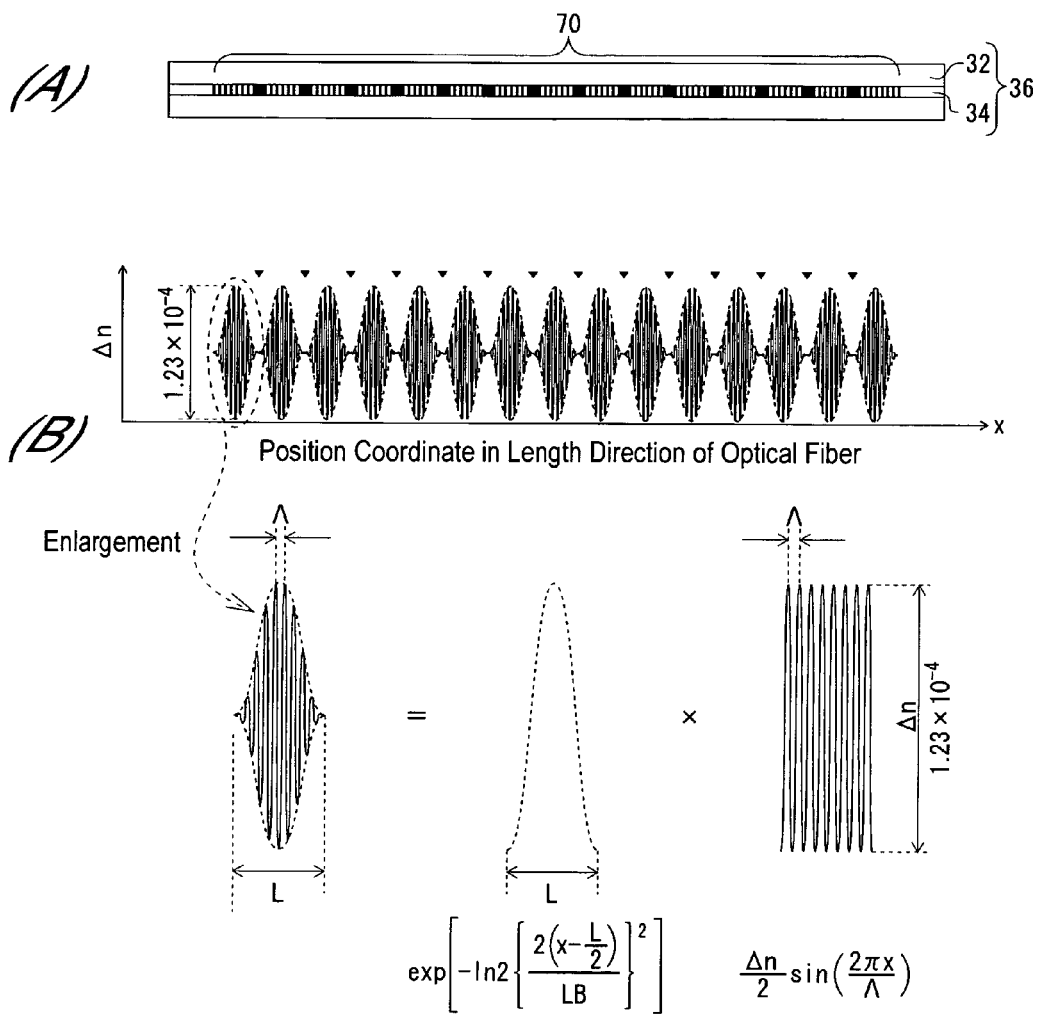
FIG. 9 is a schematic explanatory diagram of the refractive index modulation structure of the phase control means of the optical pulse time spreader of a second embodiment.

The structure of the SSFBG of the phase control means of the optical pulse time spreader constituting the second embodiment of the first invention will now be described with reference to FIGS. 9(A) and 9(B). FIG. 9(A) is a schematic cross-sectional view of the phase control means. The phase control means has a structure in which an SSFBG 70 is fixed to the core 34 of the optical fiber 36 comprising the core 34 and cladding 32. Fifteen unit FBGs are arranged in series in the waveguide direction of the core 34 constituting the optical waveguide of the optical fiber 36 to constitute the SSFBG 70. Because only the refractive index modulation structure of the SSFBG 70 is different and the other parts are the same as those of the optical pulse time spreader of the first embodiment, repeated descriptions are omitted here. The optical phase code set for the phase control means of the optical pulse time spreader of the second embodiment is the same as the optical phase code set for the phase control means of the first embodiment.

The fact that the refractive index modulation structure of the SSFBG 70 differs from the refractive index modulation structure of the SSFBG 40 of the first embodiment means that the intensity of the refractive index modulation of the periodic refractive index modulation structure of the unit FBG constituting the SSFBG 70 is apodized by means of a window function. In the second embodiment, a Gaussian error function is adopted as the window function.

FIG. 9(B) schematically shows the refractive index modulation structure of the SSFBG 70 shown in FIG. 9(A). Further, FIG. 9(B) also has enlargements of a portion of the refractive index modulation structure of the unit FBG. A description of a method of apodizing the refractive index modulation intensity of the periodic refractive index modulation structure of the unit FBG by means of a window function will now be described with reference to the part of FIG. 9(B) in which a portion of the refractive index modulation structure of the unit FBG is enlarged.

The periodic refractive index modulation structure of the unit FBG prior to apodization is fixed in the optical waveguide direction (x direction) of the optical fiber 36 the amplitude of which is given by $\Delta n/2$, as shown on the far right of FIG. 9(B). That is, the periodic refractive index modulation structure of the unit FBG prior to apodization is given by the following Equation (3):

$$(\Delta n/2)\cdot\sin(2\pi x/\Lambda) \quad (3)$$

Here, x is the position coordinate in the longitudinal direction of the optical fiber 36.

A unit FBG with a periodic refractive index modulation structure that is given by a new function rendered by multiplying Equation (3) by a window function which is given by the following Equation (4) is known as a unit FBG that is apodized by a function given by Equation (4).

$$\exp[-Ln2[2(x-(L/2))/LB]^2] \quad (4)$$

Here, Ln2 signifies the natural logarithm of 2. Further, exp signifies an exponential function in which the base of the natural logarithm is an index. Further, in the second embodiment, the settings are $\Delta n=1.23\times10^{-4}$, $L=2.346$ mm, $B=0.5$.

By performing such apodization, Bragg reflection arises in concentration in the middle of the unit FBG and, as a result, a narrowing of the half width of the time waveform of the Bragg reflected light thus generated is expected. That is, because a narrowing of the half width of the chip pulses constituting the encoded optical pulse train is expected, it is expected that it will be possible to reduce the overlap of the feet of the chip pulses constituting the encoded optical pulse train on the time axis. If the overlap of the feet of the chip pulses can be reduced, the effect of interference caused by the overlap of the feet of the chip pulses on the time axis can be reduced as mentioned earlier. As a result, in comparison with a case where encoding and decoding are performed by using an optical pulse time spreader of the first embodiment, larger values can be expected for both P/W and P/C.

Further, the function for the apodization corresponding with Equation (4) is not limited to a Gaussian function. The size of the amplitude of the periodic refractive index modulation structure of the unit FBG given by Equation (3) can be adopted as long as the size is a function permitting apodization with a maximum in the middle part of the unit FBG. For example, it is also possible to use functions that are used in signal processing technological fields such as the Raised cosine, Tanh, Blackman, Hamming, and Hanning functions and so forth, for example.

Figure 10:
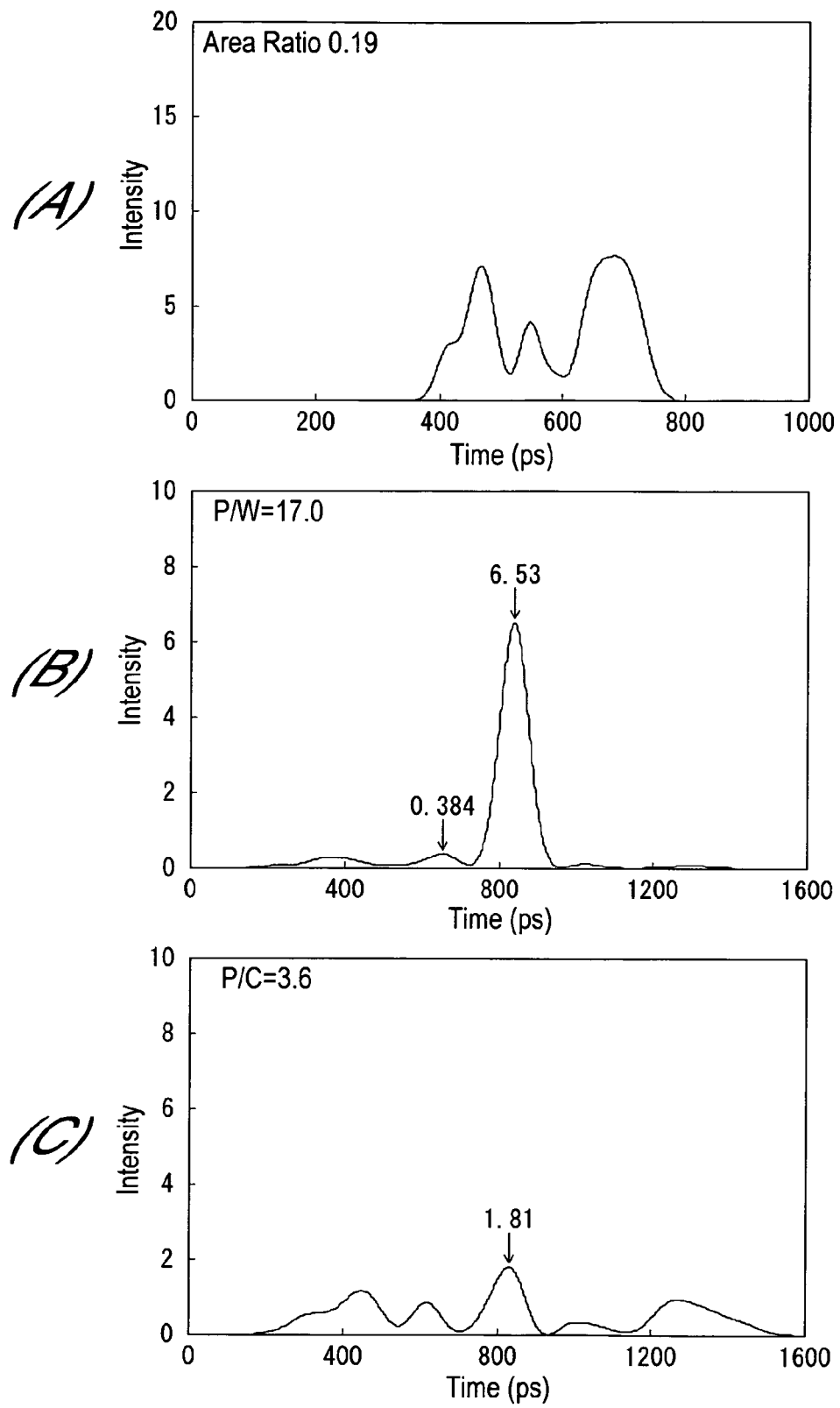
FIG. 10 shows an encoded waveform, autocorrelation waveform and cross correlation waveform of the optical pulse time spreader of the second embodiment.

FIGS. 10(A) to 10(C) show the experiment results in a case where encoding and decoding are executed by using the optical pulse time spreader of the second embodiment. FIG. 10(A) shows an encoded waveform representing an encoded optical pulse train, FIG. 10(B) shows an autocorrelation waveform, and FIG. 10(C) shows a cross correlation waveform. In FIGS. 10(A) to 10(C), the horizontal axis shows time calibrated in ps units and the vertical axis shows the optical intensity calibrated with an optional scale.

The device whose constitution was described with reference to FIG. 7 was used in the characteristic evaluation of the optical pulse time spreader of the second embodiment in the same way as when the characteristic evaluation of the optical pulse time spreader of the first embodiment was performed. Further, the half width of the optical pulse used in the characteristic evaluation of the optical pulse time spreader of the second embodiment was 40 ps.

The area ratio with respect to the encoded waveform representing the encoded optical pulse train shown in FIG. 10(A) is 0.19. This is a value that is on the order of 27% larger than the area ratio 0.15 with respect to the encoded waveform obtained by conventional phase control means. This means that the energy of the optical pulse is effectively converted to the encoded optical pulse train. That is, this means that encoding is efficiently performed and shows that the optical pulse time spreader of the second embodiment is more suitably used as an encoder.

As shown in FIG. 10(B), P=6.53, W=0.384. Further, as shown in FIG. 10(C), C=1.81. As a result, for the decoded waveform representing the autocorrelation waveform shown in FIG. 10(B), P/W=17.0 and, for the decoded waveform representing the cross correlation waveform shown in FIG. 10(C), P/C=3.6. On the other hand, the P/W value and P/C value when encoding and decoding are performed by conventional phase control means are P/W=11.8 and P/C=2.7 respectively. It is clear from this that large values are obtained for both P/W and P/C when encoding and decoding are performed by using the optical pulse time spreader of the second embodiment.

It can be seen that these values approach the maximum values for both P/W and P/C values described with reference to FIGS. 5(A) and 5(B).

Figure 4:
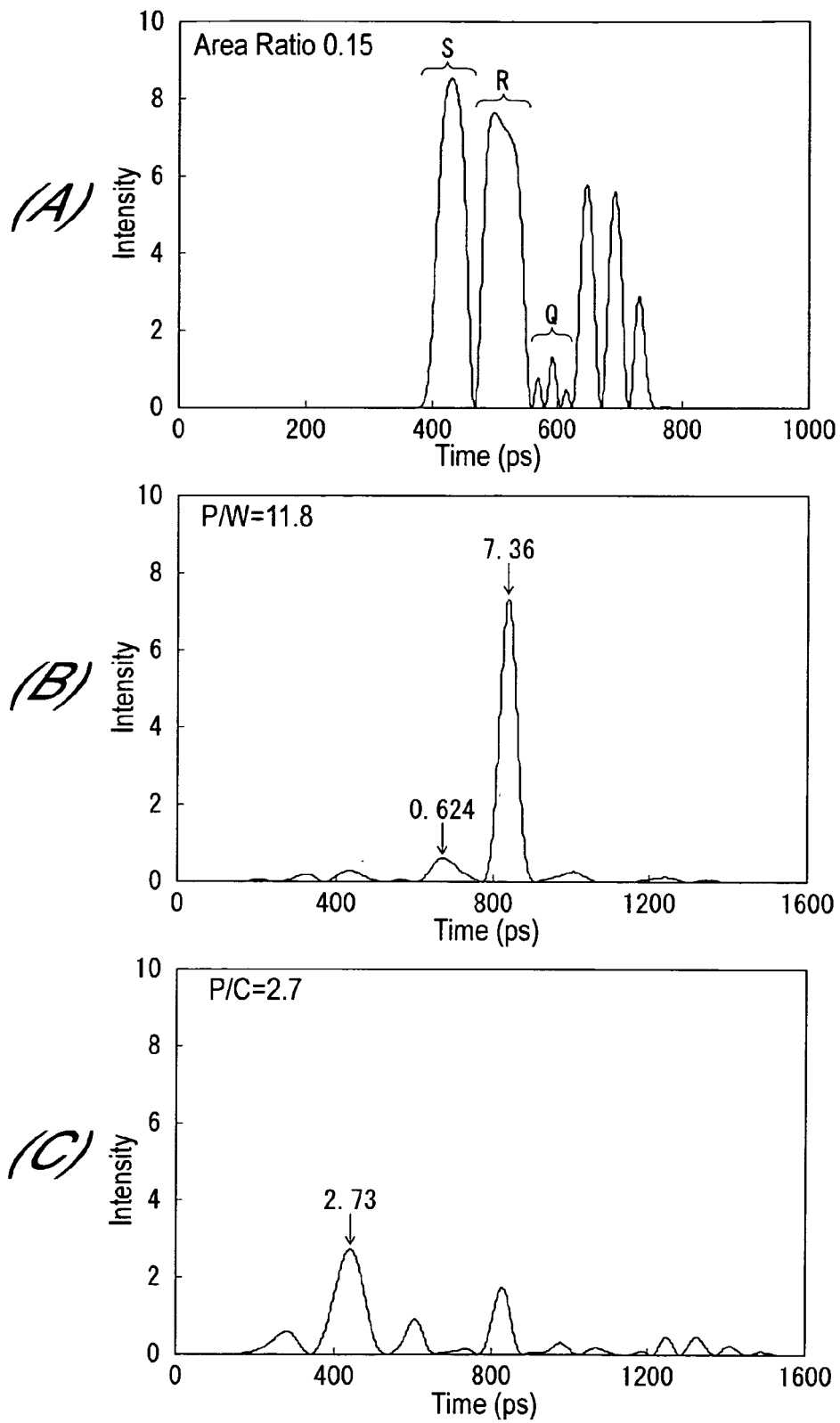
FIG. 4 shows an encoded waveform, autocorrelation waveform and cross correlation waveform of a conventional optical pulse time spreader.
Figure 11:
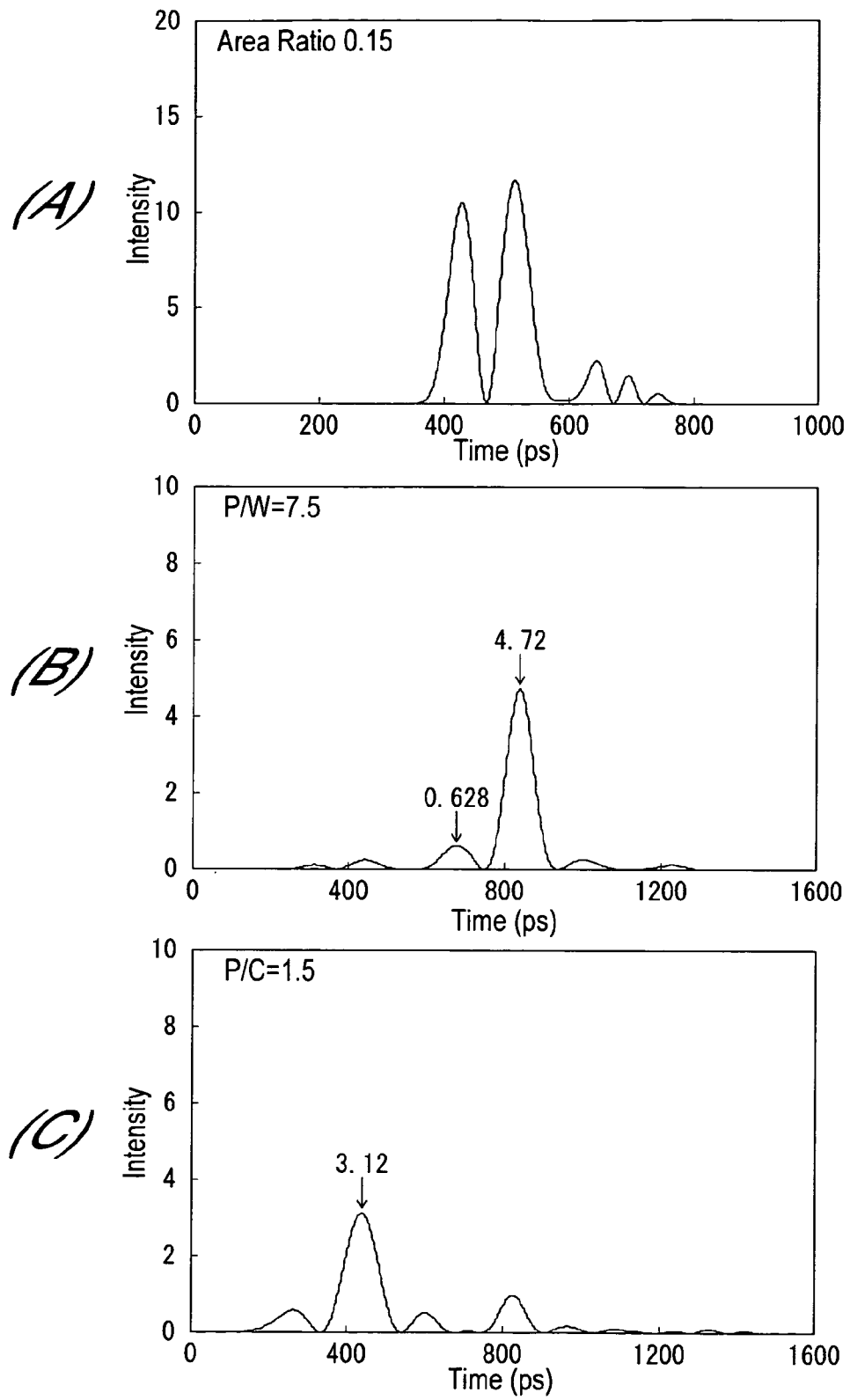
FIG. 11 shows an encoded waveform, autocorrelation waveform and cross correlation waveform of a conventional optical pulse time spreader.

Further, for the purpose of a comparison, an example in which encoding and decoding are performed by using conventional phase control means as the encoder and decoder is shown in FIGS. 11(A) to 11(C). Here, the half width of the optical pulse used in the characteristic evaluation was 40 ps. That is, the example described with reference to FIGS. 4(A) to 4(C) is an example in which encoding and decoding were performed by using an optical pulse time spreader comprising conventional phase control means as the encoder and decoder. The half width of the optical pulse used in the characteristic evaluation was set at 20 ps, which is half the half width 40 ps.

The area ratio with respect to the encoded waveform representing the encoded optical pulse train shown in FIG. 11(A) is 0.15. This equals the area ratio with respect to the encoded waveform obtained by the optical pulse time spreader that comprises conventional phase control means. This means that the energy conversion efficiency from the optical pulse to the encoded optical pulse train does not change.

As shown in FIG. 11(B), P=4.72 and W=0.628. Further, as shown in FIG. 11(C), C=3.12. As a result, in the decoded waveform representing the autocorrelation waveform shown in FIG. 11(B), P/W=7.5 and in the decoded waveform representing the cross correlation waveform shown in FIG. 11(C), P/C=1.5. On the other hand, the P/W value and P/C value in a case where encoding and decoding are performed by the optical pulse time spreader of the second embodiment are P/W=17.0 and P/C=3.6. It can be seen from this that, when encoding and decoding are performed by using the optical pulse time spreader of the second embodiment, the half value of the optical pulse used in the characteristic evaluation equals 40 ps and large values are obtained for both P/W and P/C in comparison with the characteristic of the conventional phase control means.

Third Embodiment

Figure 12:
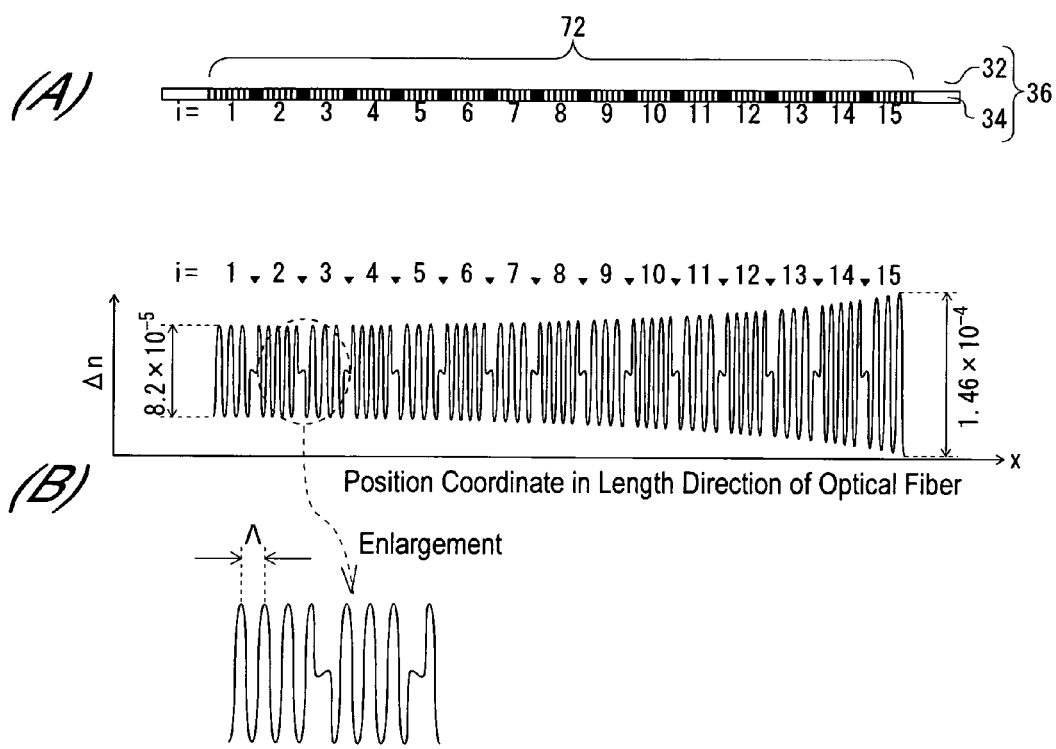
FIG. 12 is a schematic explanatory diagram of the refractive index modulation structure of the phase control means of the optical pulse time spreader of a third embodiment.

The structure of the phase control means of the optical pulse time spreader constituting the third embodiment of the first invention will now be described with reference to FIGS. 12(A) and 12(B). FIG. 12(A) is a schematic cross-sectional view of the optical pulse time spreader. The optical pulse time spreader is a structure in which the SSFBG 72 is fixed to the core 34 of the optical fiber 36 that comprises the core 34 and cladding 32. Fifteen unit FBGs are disposed in series in the waveguide direction of the core 34, which is the optical waveguide of the optical fiber 36, to constitute the SSFBG 72. Because only the refractive index modulation structure of the SSFBG 72 is different and the other parts are the same as those of the optical pulse time spreader of the first embodiment, repeated descriptions are omitted here. The optical phase code set for the phase control means of the optical pulse time spreader of the third embodiment is the same as the optical phase code set for the phase control means of the first embodiment.

The fact that the refractive index modulation structure of the SSFBG 72 differs from the refractive index modulation structure of the SSFBG 40 of the first embodiment means that the intensity of the refractive index modulation of the periodic refractive index modulation structure of the unit FBG constituting the SSFBG 72 is set as follows.

That is, this embodiment is characterized by a constitution whereby the refractive index modulation intensity of the periodic refractive index modulation structure in which unit FBGs arranged in series in the waveguide direction of the optical fiber are formed increases monotonously in the waveguide direction of the optical waveguide. More specifically, in the case of the SSFBG constituting the phase control means that comprises fifteen unit FBGs, numbers from a first number to a fifteenth number are assigned in order from one end to the other of the optical fiber to the unit FBGs and the reflectance $R_i$ from the ith ($2 \leq i \leq 15$) unit FBG is given by $$R_i = R_{i-1}/(1-R_{i-1})^2 \quad (5)$$

FIG. 12(B) schematically shows the refractive index modulation structure of the SSFBG 72 shown in FIG. 12(A). Further, FIG. 12(B) shows enlargements of a portion of the refractive index modulation structure of the unit FBG. The enlargement of a portion of the refractive index modulation structure of the unit FBG equals the refractive index modulation structure of the phase control means of the first embodiment shown in FIG. 6(B). However, the amplitude increases monotonously in the optical waveguide direction (x direction) of the optical fiber 36. In FIG. 12(B), numbers from 1 to 15 are assigned in order to identify the unit FBGs.

The modulation intensity amplitude $\Delta n$ of the refractive index modulation structure of the first unit FBG (i=1) is $8.2 \times 10^{-5}$ and the Bragg reflectance $R_1$ is 0.0238. Further, the modulation intensity amplitude $\Delta n$ of the refractive index modulation structure of the fifteenth unit FBG (i=15) is $1.46 \times 10^{-4}$ and the Bragg reflection efficiency $R_1$ is 0.0688. Table 3 shows the modulation intensity amplitude $\Delta n$ and Bragg reflectance $R_i$ (i=1, 2, . . . , 15) of the refractive index modulation structure of the first to fifteenth unit FBGs in the form of a list. The Bragg reflectance $R_i$ satisfies Equation (5) above. As per Table 3, the value of $\Delta n$ and $R_i$ are such that the amplitude increases monotonously in the optical waveguide direction (x direction) of the optical fiber 36.

TABLE 3

| Unit FBG | $\Delta n$ | Reflectance |
|---|---|---|
| 1 | $8.2 \times 10^{-5}$ | 0.0238 |
| 2 | $8.4 \times 10^{-5}$ | 0.0250 |
| 3 | $8.7 \times 10^{-5}$ | 0.0263 |
| 4 | $9.0 \times 10^{-5}$ | 0.0277 |
| 5 | $9.3 \times 10^{-5}$ | 0.0293 |
| 6 | $9.6 \times 10^{-5}$ | 0.0311 |
| 7 | $9.9 \times 10^{-5}$ | 0.0331 |
| 8 | $1.03 \times 10^{-4}$ | 0.0354 |
| 9 | $1.08 \times 10^{-4}$ | 0.0381 |
| 10 | $1.12 \times 10^{-4}$ | 0.0412 |
| 11 | $1.17 \times 10^{-4}$ | 0.0448 |
| 12 | $1.23 \times 10^{-4}$ | 0.0491 |
| 13 | $1.30 \times 10^{-4}$ | 0.0543 |
| 14 | $1.37 \times 10^{-4}$ | 0.0607 |
| 15 | $1.46 \times 10^{-4}$ | 0.0688 |

Strictly speaking, the individual unit FBGs may be constituted such that the modulation intensity amplitude $\Delta n$ of the refractive index modulation structure is increased monotonously in the waveguide direction of the optical fiber but the effects mentioned hereinbelow are adequately obtained as long as the constitution is such that the Bragg reflectance $R_i$ satisfies Equation (5).

If the design is such that the $\Delta n$ and Bragg reflectance $R_i$ of the refractive index modulation structure of the first to fifteenth unit FBGs are afforded the values shown in Table 3, the Bragg reflected light intensities from the first to fifteenth unit FBGs can all be equalized, as mentioned hereinbelow.

The optical pulse that is input to the encoder and the encoded optical pulse train that is input to the decoder are both Bragg-reflected by the first unit FBG and, at the stage where same are to enter the second unit FBG, the intensity decreases by the intensity of the Bragg reflected light of the first unit FBG. As a result, when the reflectance of the fifteen unit FBGs are all set equal, the intensity of the Bragg reflected light of the second unit FBG is smaller than the intensity of the Bragg reflected light of the first unit FBG. Thus, the intensity of the Bragg reflected light from the respective unit FBGs weakens sequentially in the order of the first to fifteenth unit FBGs.

Therefore, by establishing a constitution in which the reflectance modulation intensity of the fifteen unit FBGs disposed in series in the waveguide direction of the optical fiber is increased monotonously in the waveguide direction, the Bragg reflectance of the respective unit FBGs is set to monotonously increase sequentially in order from the first to the fifteenth unit FBGs. Thus, the Bragg reflectance can be increased to compensate for the decrease in the incident intensity to the respective unit FBGs and the Bragg reflected light intensities from the first to fifteenth unit FBGs can all be equalized.

If the Bragg reflected light intensities from the first to fifteenth unit FBGs can all be equalized, the time waveform of the encoded optical pulse train can be approximated to a shape that is smooth with respect to the time axis. In other words, this means that the encoded optical pulse is time-spread uniformly within the spreading time by the encoder. When the optical pulse is time-spread uniformly within the spreading time, the energy of the optical pulse is more efficiently converted to an encoded optical pulse train in comparison with a case where nonuniform time spreading is performed. Further, as the subsequent experiment results show, larger values are obtained for both P/W and P/C.

Figure 13:
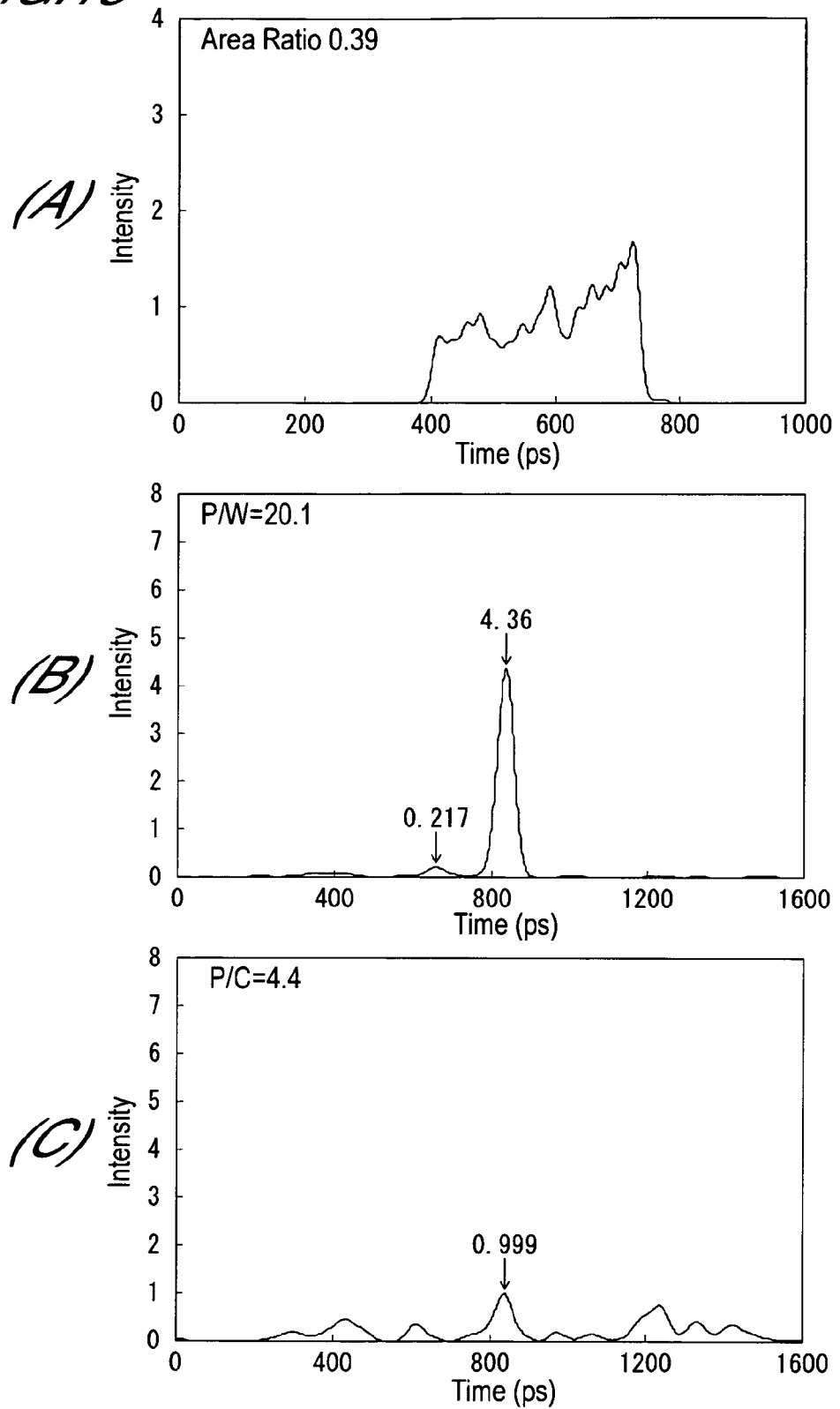
FIG. 13 shows an encoded waveform, autocorrelation waveform and cross correlation waveform of an optical pulse time spreader of the third embodiment.

FIGS. 13(A) to 13(C) shows the experiment results in a case where encoding and decoding are performed by using the optical pulse time spreader of the third embodiment. FIG. 13(A) shows an encoded waveform representing an encoded optical pulse train, FIG. 13(B) shows an autocorrelation waveform, and FIG. 13(C) shows a cross correlation waveform. In FIGS. 13(A) to 13(C), the horizontal axis shows time calibrated in ps units and the vertical axis shows the optical intensity calibrated with an optional scale.

The device whose constitution was described with reference to FIG. 7 was used in the characteristic evaluation of the optical pulse time spreader of the third embodiment in the same way as when the characteristic evaluation of the optical pulse time spreader of the first embodiment was performed. Further, the half width of the optical pulse used in the characteristic evaluation of the optical pulse time spreader of the third embodiment was 20 ps.

The area ratio with respect to the encoded waveform representing the encoded optical pulse train shown in FIG. 13(A) is 0.39. This is a value that is 2.6 times larger than the area ratio 0.15 with respect to the encoded waveform obtained by an optical pulse time spreader comprising conventional phase control means. This means that the energy of the optical pulse is effectively converted to the encoded optical pulse train. That is, this means that encoding is efficiently performed and shows that the optical pulse time spreader of the third embodiment is more suitably used as an encoder.

As shown in FIG. 13(B), P=4.36, W=0.217. Further, as shown in FIG. 13(C), C=0.999.

For the decoded waveform representing the autocorrelation waveform shown in FIG. 13(B), P/W=20.1 and, for the decoded waveform representing the cross correlation waveform shown in FIG. 13(C), P/C=4.4. On the other hand, the P/W value and P/C value when encoding and decoding are performed by an optical pulse time spreader comprising conventional phase control means are P/W=11.8 and P/C=2.7 respectively. It is clear from this that large values are obtained for both P/W and P/C when encoding and decoding are performed by using the optical pulse time spreader of the third embodiment.

It can be seen that these values approach the maximum values for both P/W and P/C values described with reference to FIGS. 5(A) and 5(B).

Figure 2A:
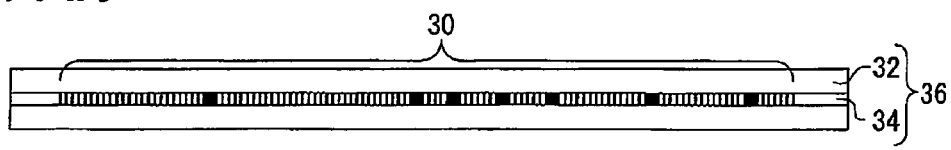
FIG. 2 is a schematic explanatory diagram of the refractive index modulation structure of the conventional phase control means.
Figure 2B:
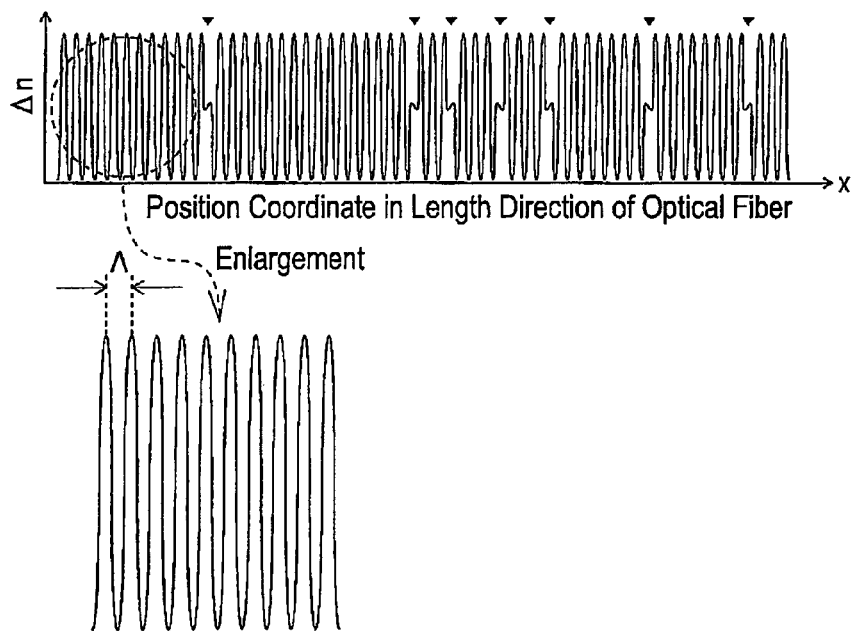
Figure 3:
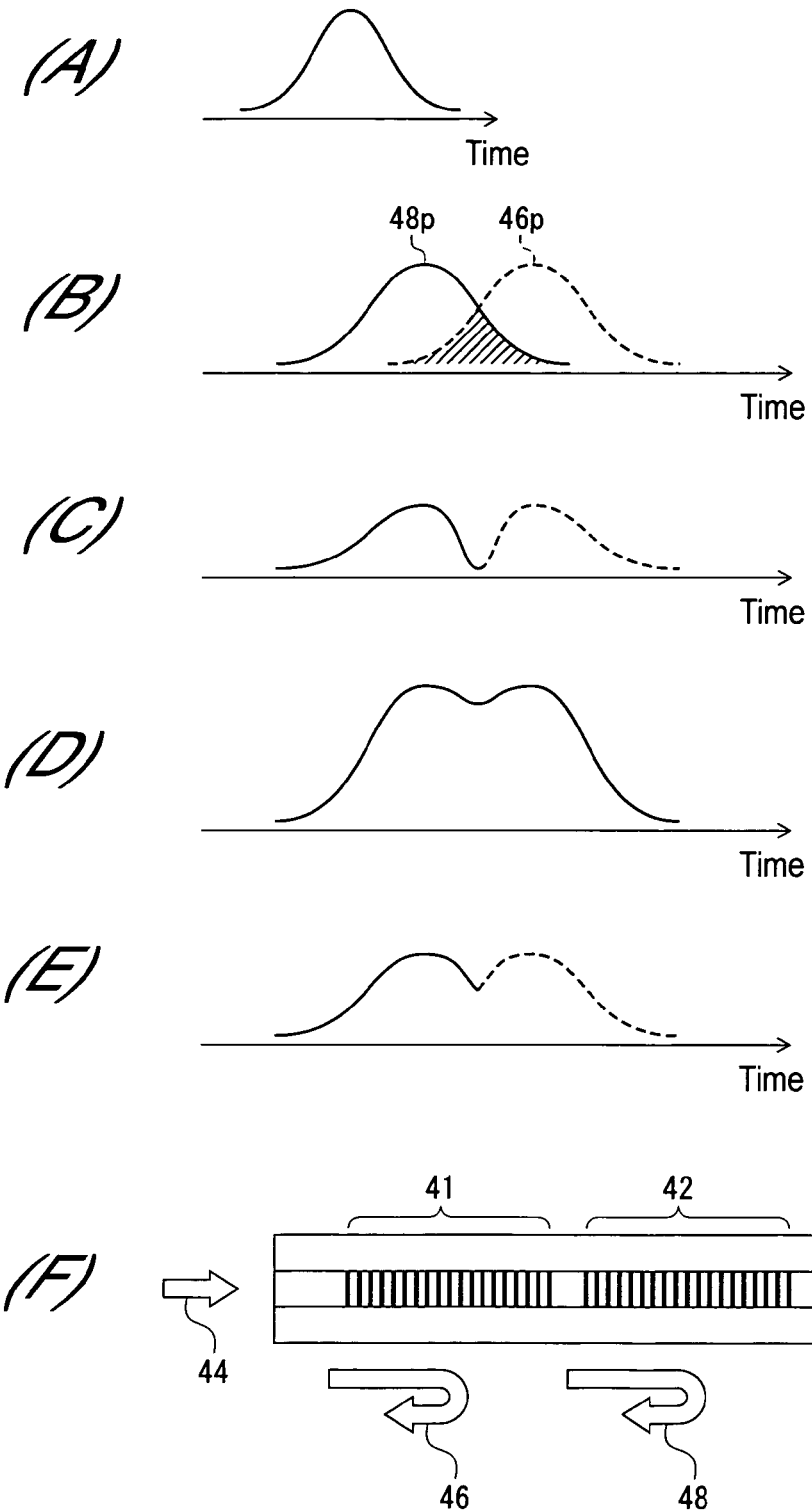
FIG. 3 serves to illustrate the effect of interference of the Bragg reflected light from unit FBGs.
Figure 14:
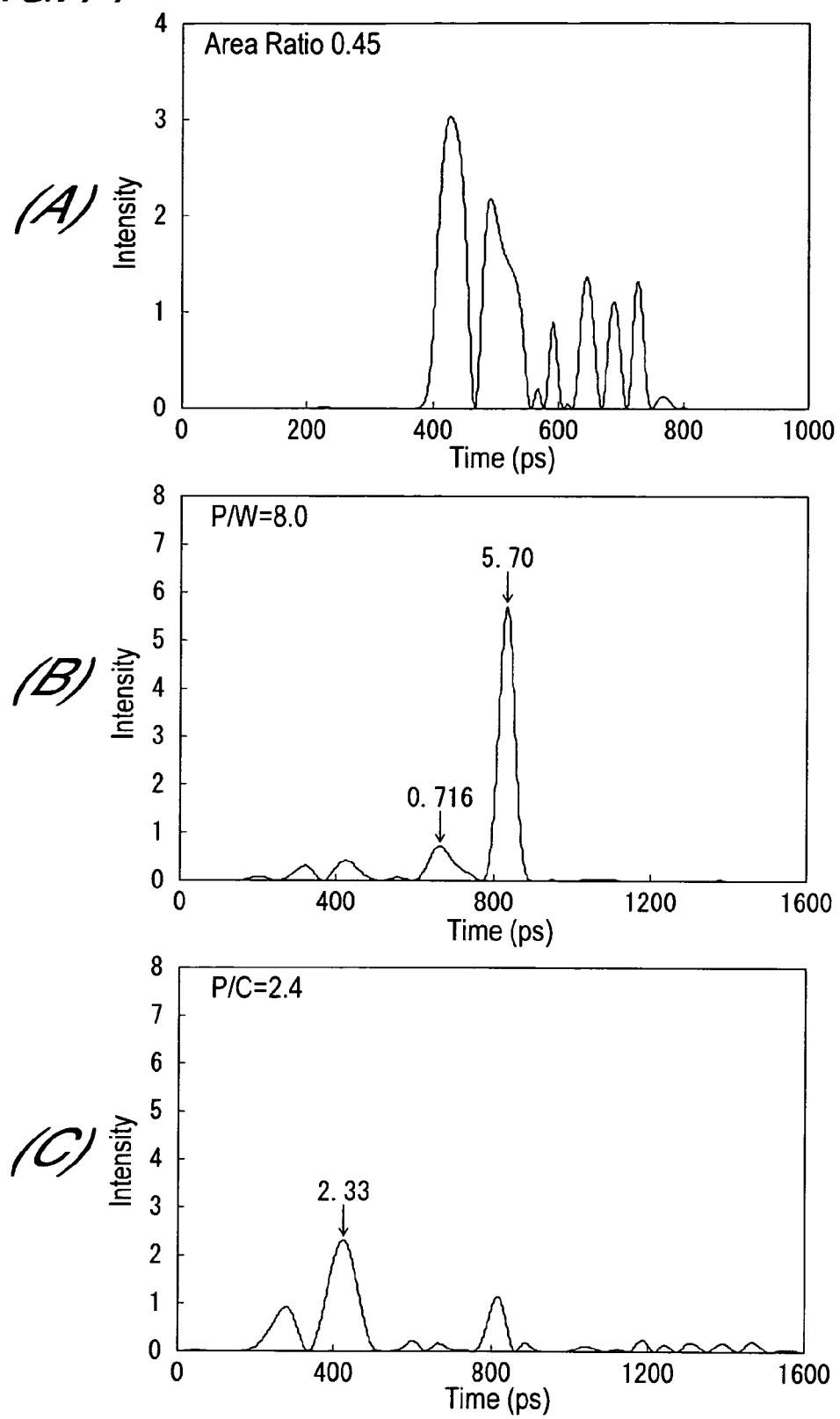
FIG. 14 shows an encoded waveform, autocorrelation waveform and cross correlation waveform of a conventional optical pulse time spreader.

Further, for the purpose of a comparison, an example in which encoding and decoding are performed by using an optical pulse time spreader comprising conventional phase control means as the encoder and decoder is shown in FIGS. 14(A) to 14(C). Here, the experiment was performed by using a conventional optical pulse time spreader that is designed so that the reflectance is two times the reflectance of the SSFBG constituting the conventional phase control means shown in FIG. 2. This serves to compare the characteristic with that of the SSFBG of a conventional optical pulse time spreader under the condition of being substantially equal to the Bragg reflectance of the SSFBG constituting the phase control means of the optical pulse time spreader of the third embodiment.

The area ratio with respect to the encoded waveform representing the encoded optical pulse train shown in FIG. 14(A) is 0.45. This is larger than the area ratio 0.39 with respect to the encoded waveform obtained by the optical pulse time spreader of the third embodiment. Therefore, the time waveform of the encoded optical pulse train has a shape of sharp asperity with respect to the time axis. That is, this means that the encoded optical pulse is time-spread nonuniformly within the spreading time by the encoder. As a result, the value of P/W and P/C is smaller than the value with respect to the optical pulse time spreader of the third embodiment as shown hereinbelow.

As shown in FIG. 14(B), P=5.70 and W=0.716. Further, as shown in FIG. 14(C), C=2.33. As a result, in the decoded waveform representing the autocorrelation waveform shown in FIG. 14(B), P/W=8.0 and, in the decoded waveform representing the cross correlation waveform shown in FIG. 14(C), P/C=2.4. On the other hand, the P/W value and P/C value in a case where encoding and decoding are performed by the optical pulse time spreader of the third embodiment are P/W=20.1 and P/C=4.4 respectively. It can be seen from this that, when encoding and decoding are performed by using the optical pulse time spreader of the third embodiment, large values are also obtained for both P/W and P/C in comparison with the characteristic of a conventional optical pulse time spreader by equalizing the Bragg reflectance.

II. Description of the Optical Code Division Multiplexing Transmission Method and Device The optical pulse time spreaders of the first to third embodiments are suitable when applied to an optical code division multiplexing transmission method (called the 'OCDM transmission method' hereinafter). That is, by adopting the optical pulse time spreader of the present invention as an encoder and decoder, an OCDM transmission method comprising the following steps can be implemented. An OCDM transmission method that is implemented by using the optical pulse time spreader of the present invention reflects the characteristic that large values are obtained for both the P/W and P/C above. Therefore, even when the intensity of the encoded optical pulse train decreases while same is propagated by the optical transmission line or optical noise invades the optical transmission line, the autocorrelation waveform peak can be extracted highly reliably through decoding. That is, an OCDM transmission method for which high reliability is secured is implemented.

The OCDM transmission method for which the optical pulse time spreader of the present invention is suitably used as the encoder and decoder comprises an encoding step of encoding an optical pulse signal by using optical phase code to generate the optical pulse signal as an encoded optical pulse signal; and a decoding step of decoding the encoded optical pulse signal by using the same code as the optical phase code to generate an autocorrelation waveform of the optical pulse signal. Further, the encoding step and the decoding step are executed by using the optical pulse time spreader of the present invention.

The OCDM transmission method can be implemented by the optical code division multiplexing transmission device ('OCDM transmission device' subsequently) that will be described subsequently. That is, the OCDM transmission device comprises an encoder that encodes an optical pulse signal by using optical phase code to generate an encoded optical pulse signal and a decoder that decodes the encoded optical pulse signal by using the same code as the optical phase code to generate an autocorrelation waveform of the optical pulse signal. That is, the encoding step is implemented by the encoder and the decoding step is implemented by the decoder. The optical pulse time spreader of the present invention is used as the encoder and decoder.

Figure 15:
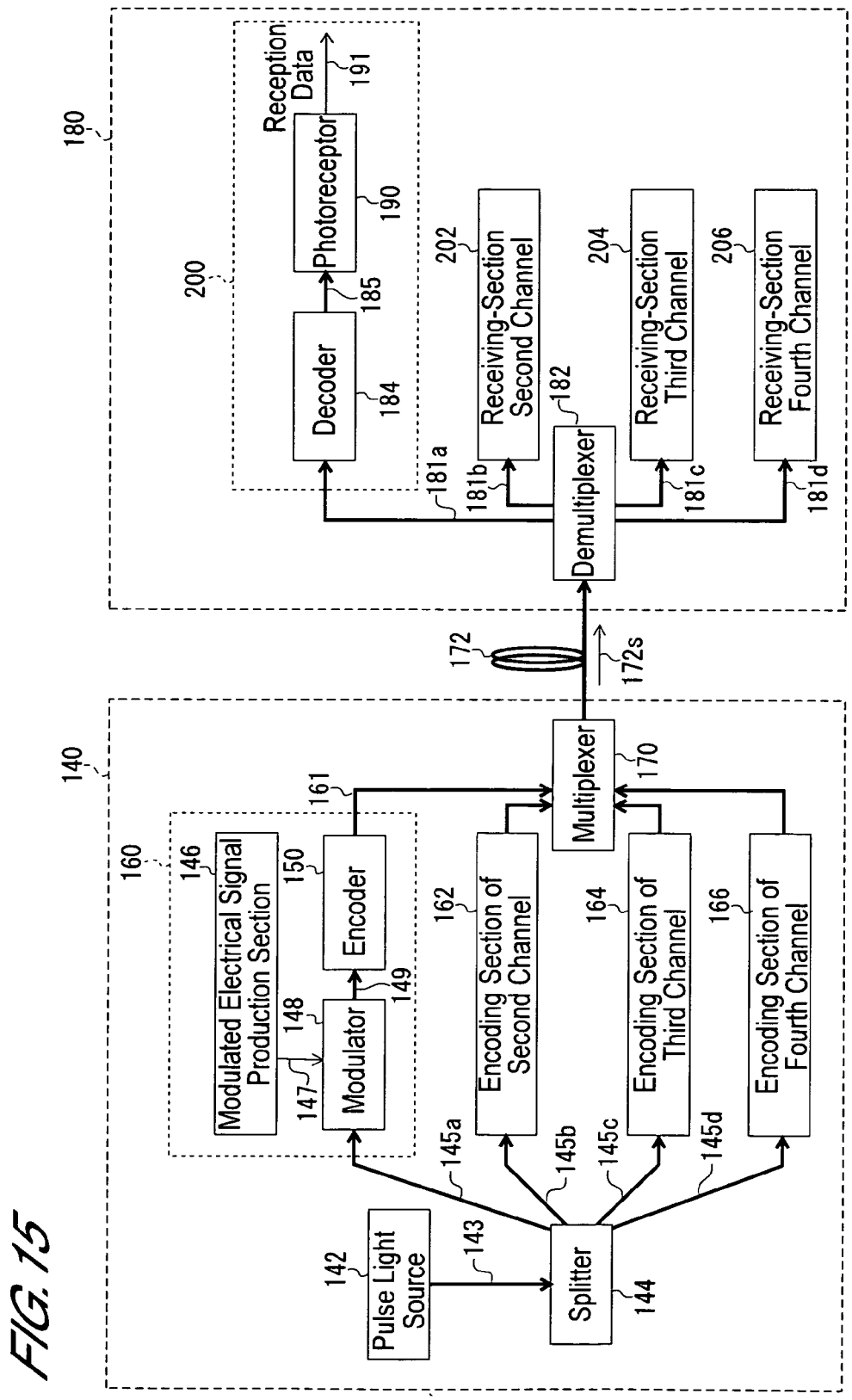
FIG. 15 is a schematic block constitutional view of the OCDM transmission device.

A suitable constitution for the OCDM transmission device constituting the second invention and the functions thereof will be described by using the optical pulse time spreader of the first invention described with reference to FIGS. 6 to 14 (optical pulse time spreader of the first to third embodiments) will now be described with reference to FIG. 15. In FIG. 15, optical signal paths such optical fibers are indicated by bold lines and electrical signal paths are indicated by narrow lines. Further, the numbers assigned to the bold lines and narrow lines signify the optical signals or electrical signals propagated by the respective paths in addition to indicating the paths.

FIG. 15 shows an OCDM transmission device of a four-channel constitution by way of example but the OCDM transmission device is not limited to four channels. The following description is similarly valid irrespective of the number of channels in the constitution.

The OCDM transmission device is constituted to generate an encoded optical pulse signal for each channel in a transmitting section 140 and multiplexes the encoded optical pulse signals of all the channels by means of a multiplexer 170 to produce a transmission signal 172s and transmits the transmission signal 172s to a receiving section 180 via an optical transmission line 172.

The transmission signal 172s, which is produced by multiplexing the encoded optical pulse signals of all the channels transmitted to the receiving section 180, is intensity-divided in a number equal to the number of channels as encoded optical pulse signals by a splitter 182. Further, each of the intensity-divided encoded optical pulse signals 181a, 181b, 181c, and 181d are input to a receiving-section first channel 200, a receiving-section second channel 202, a receiving-section third channel 204, and a receiving-section fourth channel 206 of the receiving section 180.

First, the functional part that produces base optical pulse trains for generating optical pulse signals which are the transmission signals of each channel and supplies the optical pulse trains to the respective channels will be described. This part is constituted comprising a pulse light source 142 and a splitter 144.

The pulse light source 142 can be constituted by using a distributed feedback semiconductor laser, for example. The light source, which is constituted to convert continuous wave light output by the DFB-LD into an optical pulse train by means of an optical modulator (not shown) and to output the optical pulse train from one optical fiber end, is a pulse light source 142. The output light 143 of the pulse light source 142 is intensity-divided for a number of channels (four here) by the splitter 144 and distributed to the respective channels. That is, the output light 143 is intensity-divided as the optical pulse train 145a, optical pulse train 145b, optical pulse train 145c, and optical pulse train 145d and supplied to the first to fourth channels respectively.

Because the subsequent description of the encoding section is common to each channel, the description will be provided here by taking the first channel as an example. A transmitting-section first channel 160, which is the encoding section of the first channel, is constituted comprising a modulated electrical signal production section 146, a modulator 148, and an encoder 150. The second channel 162, third channel 164, and fourth channel 166 have the same structure as the first channel 160. The difference lies with optical phase code that is set for the encoder that each channel comprises. The optical phase code is set differently for each channel. As a result, optical pulse signals can be sent and received independently for each channel. With the exception of the encoder, the first to fourth channels all have the same structure.

The encoding section is a part that executes an encoding step of generating an encoded optical pulse signal by using optical phase code to encode an optical pulse signal that contains light of different wavelengths in a number equal to the number of channels.

As mentioned earlier, the required constituent elements for constituting the encoding section 160 are the modulated electrical signal production section 146, modulator 148, and encoder 150. The modulated electrical signal production section 146 executes a step of producing an electrical pulse signal 147 that represents a transmission signal. The electrical pulse signal 147 is an electrical signal that is generated as a binary digital electrical signal in which transmission information allocated to the first channel is reflected.

The modulator 148 executes a step of converting the optical pulse train 145a to an optical pulse signal 149 by means of the electrical pulse signal 147. The optical pulse train 145a is intensity-modulated to the RZ format that reflects the electrical pulse signal 147 by the modulator 148 and generated as the optical pulse signal 149.

The encoder 150 executes a step of encoding the optical pulse signal 149 by using optical phase code to generate an encoded optical pulse signal 161. The encoder 150 is provided with an optical pulse time spreader of the present invention, which has a function to encode the optical pulse signal 149 by means of the optical phase code to generate an encoded optical pulse signal 161. Further, the decoder 184 provided in the reception-channel first channel 200 of the receiving section 180 also comprises an optical pulse time spreader for which the same optical phase code as the optical phase code set for the encoder 150 has been set.

The decoder 184 decodes the encoded optical pulse signal 181a allocated to the first intensity-divided channel by using the same code as the optical phase code set for the encoder 150 of the first channel. As a result, the decoder 184 generates a playback optical pulse signal comprising an autocorrelation waveform component of the optical pulse signal of the first channel and a cross correlation waveform component of the optical pulse signal of the second to fourth channels.

That is, the decoder 184 extracts only an autocorrelation waveform component 185 of the optical pulse signal of the first channel. The autocorrelation waveform component 185 is converted into an electrical signal by a photoreceptor 190 to generate a reception signal 191 of the first channel. The waveform of the reception signal 191 is a signal that reflects the electrical pulse signal 147 output by the modulated electrical signal production section 146 that the encoding section 160 of the first channel of the transmitting section 140 comprises. Thus, the electrical pulse signal 147 that is to be transmitted via the first channel is received as the reception signal 191 of the first channel by the receiving section 180.

The OCDM transmission method and OCDM transmission device constituting the second invention are implemented by using the optical pulse time spreader of the first invention. Therefore, according to the OCDM transmission method and OCDM transmission device constituting the second invention, the intensity of the encoded optical pulse train decreases as a result of light absorption of the optical fiber constituting the transmission line and, even though optical noise produced by an optical amplifier that is integrated into the device if required invades the encoded optical pulse train, the autocorrelation waveform can be extracted highly reliably. That is, if the OCDM transmission device is constituted by using the optical pulse time spreader constituting the first invention, the P/W value can be increased and, therefore, identification of the peak of the autocorrelation waveform is straightforward. Further, because the P/C value can also be made large, the autocorrelation waveform and cross correlation waveform can be easily separated.

Therefore, the OCDM transmission device, which uses the optical pulse time spreader of the first to third embodiments of the present invention, affords the effect of being able to separate the cross correlation waveform component from the decoded optical pulse signal from the autocorrelation waveform and relax the identification conditions set for the judgment circuit for identifying the autocorrelation waveform.

Moreover, because the characteristic of the encoder is approximated to the results of an ideal code correlation simulation, the system design is straightforward when the OCDM transmission device is used.

The invention claimed is:

1. An optical code division multiplexing transmission method, comprising:
  an encoding step of encoding an optical pulse signal by using an encoding optical phase code to generate an encoded optical pulse signal; and
  a decoding step of decoding said encoded optical pulse signal by using a decoding optical phase code to generate an autocorrelation waveform of the optical pulse signal, said decoding optical phase code being based on said encoding optical phase code,
  wherein said encoding step and said decoding step are executed by using optical pulse time spreaders, each of which time-spreads an optical pulse to form a series of chip pulses that are sequentially arranged on a time axis to provide a chip pulse stream, by using encoding that employs an optical phase code, and that outputs said chip pulse stream, and wherein each optical pulse time spreader includes an optical waveguide having a phase control means for generating said chip pulse stream, wherein said phase control means comprises a plurality of unit diffraction gratings having a periodic refractive index modulation structure that are arranged in a row and correspond one for one with code values constituting said optical phase code, said unit diffraction gratings being arranged in series in a waveguide direction of the optical waveguide, and wherein the phase difference of Bragg reflected light from two unit diffraction gratings that adjoin one another from front to back and provide equal code values is given by:

$$2\pi M + (\pi/2) \quad \text{(expression 1), and}$$

the phase difference of Bragg reflected light from two unit diffraction gratings that adjoin one another from front to back and provide different code values is given by:

$$2\pi M + (2N+1)\pi + (\pi/2) \quad \text{(expression 2)}$$

(where M and N are integers).

2. The method according to claim 1, wherein each unit diffraction grating provides a refractive index modulation intensity that is apodized by means of a window function.

3. The method according to claim 1, wherein said unit diffraction gratings arranged in series in the waveguide direction of said optical waveguide provide refractive index modulation intensities that monotonically increase in said waveguide direction of the optical waveguide.

4. The method according to claim 1,
wherein said phase control means has a number J (J is a natural number of 2 or more) of unit diffraction gratings,
wherein numbers from first to Jth are assigned to said unit diffraction gratings sequentially from one end of said optical waveguide to the other end thereof, and
wherein the ith ($2 \leq i \leq J$) unit diffraction grating has a reflectance Ri that is given by $$Ri = Ri-1/(1-Ri-1)2 \quad \text{(expression 3)}.$$

5. An optical code division multiplexing transmission device, comprising:
an encoder that encodes an optical pulse signal by using an encoding optical phase code to generate an encoded optical pulse signal; and
a decoder that decodes said encoded optical pulse signal by using a decoding optical phase code to generate an autocorrelation waveform of said optical pulse signal, said decoding optical phase code being based on said encoding optical phase code,
wherein said encoder and said decoder are optical pulse time spreaders, each of which time-spreads an optical pulse to form a series of chip pulses that are sequentially arranged on a time axis to provide a chip pulse stream, by using encoding that employs an optical phase code, and that outputs said chip pulse stream, and
wherein each optical pulse time spreader includes an optical waveguide having a phase control means for generating said chip pulse stream,
wherein said phase control means comprises a plurality of unit diffraction gratings having a periodic refractive index modulation structure that are arranged in a row and correspond one for one with code values constituting said optical phase code, said unit diffraction gratings being arranged in series in a waveguide direction of the optical waveguide, and wherein the phase difference of Bragg reflected light from two unit diffraction gratings that adjoin one another from front to back and provide equal code values is given by:

$$2\pi M + (\pi/2) \quad \text{(expression 1), and}$$

the phase difference of Bragg reflected light from two unit diffraction gratings that adjoin one another from front to back and provide different code values is given by:

$$2\pi M + (2N+1)\pi + (\pi/2) \quad \text{(expression 2)}$$

(where M and N are integers).

6. An optical code division multiplexing transmission method, comprising:
an encoding step of encoding an optical pulse signal by using an encoding optical phase code to generate an encoded optical pulse signal; and
a decoding step of decoding said encoded optical pulse signal by using a decoding optical phase code to generate an autocorrelation waveform of the optical pulse signal, said decoding optical phase code being based on said encoding optical phase code,
wherein said encoding step and said decoding step are executed by using the optical pulse time spreaders, each of which time-spreads an optical pulse to form a series of chip pulses that are sequentially arranged on a time axis to provide a chip pulse stream, by using encoding that employs an optical phase code, and that outputs said chip pulse stream, and
wherein each optical pulse time spreader includes an optical waveguide having a phase control means for generating said chip pulse stream,
wherein said phase control means comprises a plurality of unit diffraction gratings having a periodic refractive index modulation structure that are arranged in a row and correspond one for one with code values constituting said optical phase code, said unit diffraction gratings being arranged in series in a waveguide direction of the optical waveguide, and
wherein the phase difference of Bragg reflected light from two unit diffraction gratings that adjoin one another from front to back and provide different code values is given by:

$$2\pi M + (\pi/2) \quad \text{(expression 1), and}$$

the phase difference of Bragg reflected light from two unit diffraction gratings that adjoin one another from front to back and provide equal code values is given by:

$$2\pi M + (2N+1)\pi + (\pi/2) \quad \text{(expression 2)}$$

(where M and N are integers).

7. The method according to claim 6, wherein each unit diffraction grafting provides a refractive index modulation intensity that is apodized by means of a window function.

8. The method according to claim 6, wherein said unit diffraction gratings arranged in series in the waveguide direction of said optical waveguide provide refractive index modulation intensities that monotonically increase in said waveguide direction of the optical waveguide.

9. The method according to claim 6,
wherein said phase control means has a number J (J is a natural number of 2 or more) of unit diffraction gratings,
wherein numbers from first to Jth are assigned to said unit diffraction gratings sequentially from one end of said optical waveguide to the other end thereof, and
wherein the ith ($2 \leq i \leq J$) unit diffraction grating has a reflectance Ri that is given by reflectance $Ri=Ri-1/(1-Ri+1)2$ (expression 3).

10. An optical code division multiplexing transmission device, comprising:
an encoder that encodes an optical pulse signal by using an encoding optical phase code to generate an encoded optical pulse signal; and
a decoder that decodes said encoded optical pulse signal by using a decoding optical phase code to generate an autocorrelation waveform of said optical pulse signal, said decoding optical phase code being based on said encoding optical phase code,
wherein said encoder and said decoder are optical pulse time spreaders, each of which time-spreads an optical pulse to form a series of chip pulses that are sequentially arranged on a time axis to provide a chip pulse stream, by using encoding that employs an optical phase code, and that outputs said chip pulse stream, and
wherein each optical pulse time spreader includes an optical waveguide having a phase control means for generating said chip pulse stream,
wherein said phase control means comprises a plurality of unit diffraction gratings having a periodic refractive index modulation structure that are arranged in a row and correspond one for one with code values constituting said optical phase code, said unit diffraction gratings being arranged in series in a waveguide direction of the optical waveguide, and
wherein the phase difference of Bragg reflected light from two unit diffraction gratings that adjoin one another from front to back and provide different code values is given by:

$$2\pi M+(\pi/2) \qquad \text{(expression 1), and}$$

the phase difference of Bragg reflected light from two unit diffraction gratings that adjoin one another from front to back and provide equal code values is given by:

$$2\pi M+(2N+1)\pi+(\pi/2) \qquad \text{(expression 2)}$$

(where M and N are integers).

* * * * *